US008881665B2

(12) United States Patent
Brizard et al.

(10) Patent No.: US 8,881,665 B2
(45) Date of Patent: Nov. 11, 2014

(54) DEPLOYMENT AND RECOVERY VESSEL FOR AUTONOMOUS UNDERWATER VEHICLE FOR SEISMIC SURVEY

(75) Inventors: Thierry Brizard, Massy (FR); Alice Hervé, Paris (FR); Erwan Postic, Jakarta (ID); Robert Dowle, Massy (FR); Jonathan Grimsdale, Orsay (FR)

(73) Assignee: Cggveritas Services SA, Massy Cedex (FR)

( * ) Notice: Subject to any disclaimer, the term of this patent is extended or adjusted under 35 U.S.C. 154(b) by 124 days.

(21) Appl. No.: 13/616,327

(22) Filed: Sep. 14, 2012

(65) Prior Publication Data

US 2013/0081564 A1    Apr. 4, 2013

Related U.S. Application Data

(60) Provisional application No. 61/541,214, filed on Sep. 30, 2011.

(51) Int. Cl.
*B63B 35/40* (2006.01)
*B63B 27/36* (2006.01)

(52) U.S. Cl.
CPC .................................... *B63B 27/36* (2013.01)
USPC ............................................. 114/259; 367/15

(58) Field of Classification Search
USPC .......... 114/258, 259, 312; 367/15, 19, 20, 21; 701/2, 21, 23; 405/185, 188, 190, 191
See application file for complete search history.

(56) References Cited

U.S. PATENT DOCUMENTS

| 5,253,605 A | 10/1993 | Collins |
| 5,894,450 A | 4/1999 | Schmidt et al. |
| 6,390,012 B1 | 5/2002 | Watt et al. |
| 6,474,254 B1 | 11/2002 | Ambs et al. |
| 6,625,083 B2 | 9/2003 | Vandenbroucke |
| 6,779,475 B1 | 8/2004 | Crane et al. |
| 6,932,185 B2 | 8/2005 | Bary et al. |
| 7,252,046 B1 | 8/2007 | Ead et al. |
| 7,796,466 B2 | 9/2010 | Combee et al. |
| 8,096,254 B1 | 1/2012 | Bauer et al. |
| 8,109,223 B2 | 2/2012 | Jamieson |

(Continued)

FOREIGN PATENT DOCUMENTS

| CN | 102213594 A | 10/2011 |
| EP | 1217390 A1 | 6/2002 |

(Continued)

OTHER PUBLICATIONS

D. R. Yoerger, et al.; "Fine-scale seafloor survey in rugged deep-ocean terrain with an autonomous robot"; Robotics and Automation 2000, Proceedings, ICRA, International Conference on Apr. 24-28, 2000; Abstract; vol. 2; IEEE Eplore Digital Library; ISBN 0-7803-5886-4; Aug. 6, 2002; San Francisco, CA.

(Continued)

*Primary Examiner* — Lars A Olson
(74) *Attorney, Agent, or Firm* — Patent Portfolio Builders PLLC

(57) ABSTRACT

Method and vessel for performing marine acoustic survey of a subsurface. The vessel includes a launching module configured to deploy an autonomous underwater vehicle (AUV) underwater; a recovery module configured to recover the AUV; a homing device mounted on the recovery module and configured to guide the AUV to the recovery module; and a management module connecting the launching module to the recovery module and configured to transport the AUV.

18 Claims, 26 Drawing Sheets

(56) References Cited

U.S. PATENT DOCUMENTS

| | | |
|---|---|---|
| 2010/0000459 A1 | 1/2010 | Colangelo |
| 2010/0157727 A1 | 6/2010 | Woodard, Jr. et al. |
| 2010/0182870 A1 | 7/2010 | Norris et al. |
| 2010/0302901 A1 | 12/2010 | Welker et al. |
| 2011/0297121 A1 | 12/2011 | Kraus et al. |
| 2012/0069702 A1 | 3/2012 | Muyzert et al. |

FOREIGN PATENT DOCUMENTS

| | | |
|---|---|---|
| EP | 1319964 A2 | 6/2003 |
| WO | 01/73477 A2 | 10/2001 |
| WO | 2011/106237 A2 | 9/2011 |
| WO | 2012/013171 A1 | 2/2012 |
| WO | 2012/013962 A1 | 2/2012 |

OTHER PUBLICATIONS

Rhonda Duey; "'Flying' Nodes Shift Marine Seismic Paradigm"; Dec. 1, 2011; pp. 1-2; [downloaded on Feb. 28, 2012 http://www.epmag.com/item/print/Flying-Nodes-Shift-Marine-Seismic-Paradigm-92689].

Tadahiro Hyakudome; "Design of Autonomous Underwater Vehicle"; Japan Agency for Marine-Earth Science and Technology (JAMSTEC), Japan; International Journal of Advanced Robotic Systems; vol. 8, No. 1 (2011) ISSN 1729-8806; pp. 122-130; [downloaded from http://www.intechopen.com/journals/international_journal_of_advanced_robotic_systems/design-of-autonomous-underwater-vehicle].

Hiroshi Yoshida, et al.; "New Attempts in the MR-X1 Sea-Trials: The Working AUV Tries to Survey of the Sea Floor and to Take Mud Samples"; Paper No. OMAE2010-20347; ASME 2010 29th International Conference on Ocean, Offshore and Arctic Engineering (MAE2010); Abstract; Jun. 6-11, 2010; Shanghai, China; [downloaded Feb. 28, 2012 at http://dx.doi.org/10.1115/OMAE2010-20347].

International Search Report in corresponding International Application No. PCT/EP2012/069144 mailed Feb. 4, 2013.

Written Opinion in corresponding International Application No. PCT/EP2012/069144 mailed Feb. 4, 2013.

International Search Report in corresponding International Application No. PCT/EP2012/069145 mailed Feb. 6, 2013.

Written Opinion in corresponding International Application No. PCT/EP2012/069145 mailed Feb. 6, 2013.

DEPLOYMENT AND RECOVERY VESSEL FOR AUTONOMOUS UNDERWATER VEHICLE FOR SEISMIC SURVEY

RELATED APPLICATION

The present application is related to, and claims priority from U.S. Provisional Patent Application No. 61/541,214, filed Sep. 30, 2011, entitled "DEPLOYMENT AND RECOVERY VESSEL FOR AUTONOMOUS UNDERWATER VEHICLE FOR SEISMIC SURVEY," the disclosure of which is incorporated herein by reference.

BACKGROUND

1. Technical Field

Embodiments of the subject matter disclosed herein generally relate to methods and systems and, more particularly, to mechanisms and techniques for performing a marine seismic survey using autonomous underwater vehicles (AUVs) that carry appropriate seismic sensors.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which are especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon deposits.

A traditional system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to a surface 14 of the ocean. The streamers may be disposed to have other than horizontal spatial arrangements. The vessel 10 also tows a seismic source array 16 that is configured to generate a seismic wave 18. The seismic wave 18 propagates downwards toward the seafloor 20 and penetrates the seafloor until eventually a reflecting structure 22 (reflector) reflects the seismic wave. The reflected seismic wave 24 propagates upwardly until it is detected by the receiver 11 on the streamer 12. Based on the data collected by the receiver 11, an image of the subsurface is generated by further analyses of the collected data.

The seismic source array 16 includes plural individual source elements. The individual source elements may be distributed in various patterns, e.g., circular, linear, at various depths in the water. FIG. 2 shows a vessel 40 towing two cables 42 provided at respective ends with deflectors 44. Plural lead-in cables 46 are connected to streamers 50. The plural lead-in cables 46 also connect to the vessel 40. The streamers 50 are maintained at desired separations from each other by separation ropes 48. Plural individual source elements 52 are also connected to the vessel 40 and to the lead-in cables 46 via ropes 54.

However, this traditional configuration is expensive as the cost of the streamers is high. In addition, this configuration might not provide accurate results as a coupling between the seismic receivers and seabed is poor. To overcome this last problem, new technologies deploy plural seismic sensors on the bottom of the ocean (ocean bottom cables) to improve the coupling. Even so, positioning the seismic sensors remains a challenge.

Other technologies use permanent receivers set on the sea bottom, as disclosed in U.S. Pat. No. 6,932,185, the entire content of which is incorporated herein by reference. In this case, the seismic sensors 60 are attached, as shown in FIG. 3 (which corresponds to FIG. 4 of the patent), to a heavy pedestal 62. A station 64 that includes the seismic sensors 60 is launched from a vessel and arrives, due to its gravity, to a desired position. The station 64 remains on the bottom of the ocean permanently. Data recorded by sensors 60 is transferred through a cable 66 to a mobile station 68. When necessary, the mobile station 68 may be brought to the surface to retrieve the data.

Although this method provides a better coupling between the seabed and the sensors, the method is still expensive and not flexible as the stations and corresponding sensors are left on the ocean bottom.

An improvement to this method is described, for example, in European Patent No. EP 1 217 390, the entire content of which is incorporated herein by reference. In this document, a sensor 70 (see FIG. 4) is removably attached to a pedestal 72 together with a memory device 74. After recording the seismic waves, the sensor 70 together with the memory device 74 are instructed by a vessel 76 to detach from the pedestal 72 and to surface at the ocean surface 78 to be picked up by the vessel 76.

However, this configuration is not very reliable as the mechanism maintaining the sensor 70 connected to the pedestal 72 may fail to release the sensor 70. Also, the sensor 70 and pedestal 72 may not achieve their intended positions on the bottom of the ocean. Further, the fact that the pedestals 72 are left behind increase to ocean pollution and the survey price, which are both undesirable.

Accordingly, it would be desirable to provide systems and methods that provide an inexpensive and non-polluting device for reaching the bottom of the ocean, recording seismic waves and resurfacing for data collection.

SUMMARY

According to one exemplary embodiment, there is a vessel for performing a marine acoustic survey of a subsurface. The vessel includes a launching module configured to launch an autonomous underwater vehicle (AUV) in water; a recovery module configured to recover the AUV from the water; a homing device mounted on the recovery module and configured to guide the AUV to the recovery module while in the water; and a management module connecting the launching module to the recovery module and configured to transport the AUV while on the vessel.

According to another exemplary embodiment, there is a vessel for performing a marine acoustic survey of a subsurface. The vessel includes a launching module configured to launch an autonomous underwater vehicle (AUV) underwater; a recovery module configured to recover the AUV; and a management module connecting the launching module to the recovery module and configured to transport the AUV while on a deck of the vessel.

According to still another exemplary embodiment, there is a method for performing a marine acoustic survey of a subsurface. The method includes a step of deploying through a launching module an autonomous underwater vehicle (AUV)

underwater; a step of guiding the AUV to a recovery module with a homing device mounted on the recovery module after the AUV has recorded seismic data of the subsurface; a step of recovering with the recovery module the AUV; and a step of transporting the recovered AUV with a management module back to the launching module for redeployment.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
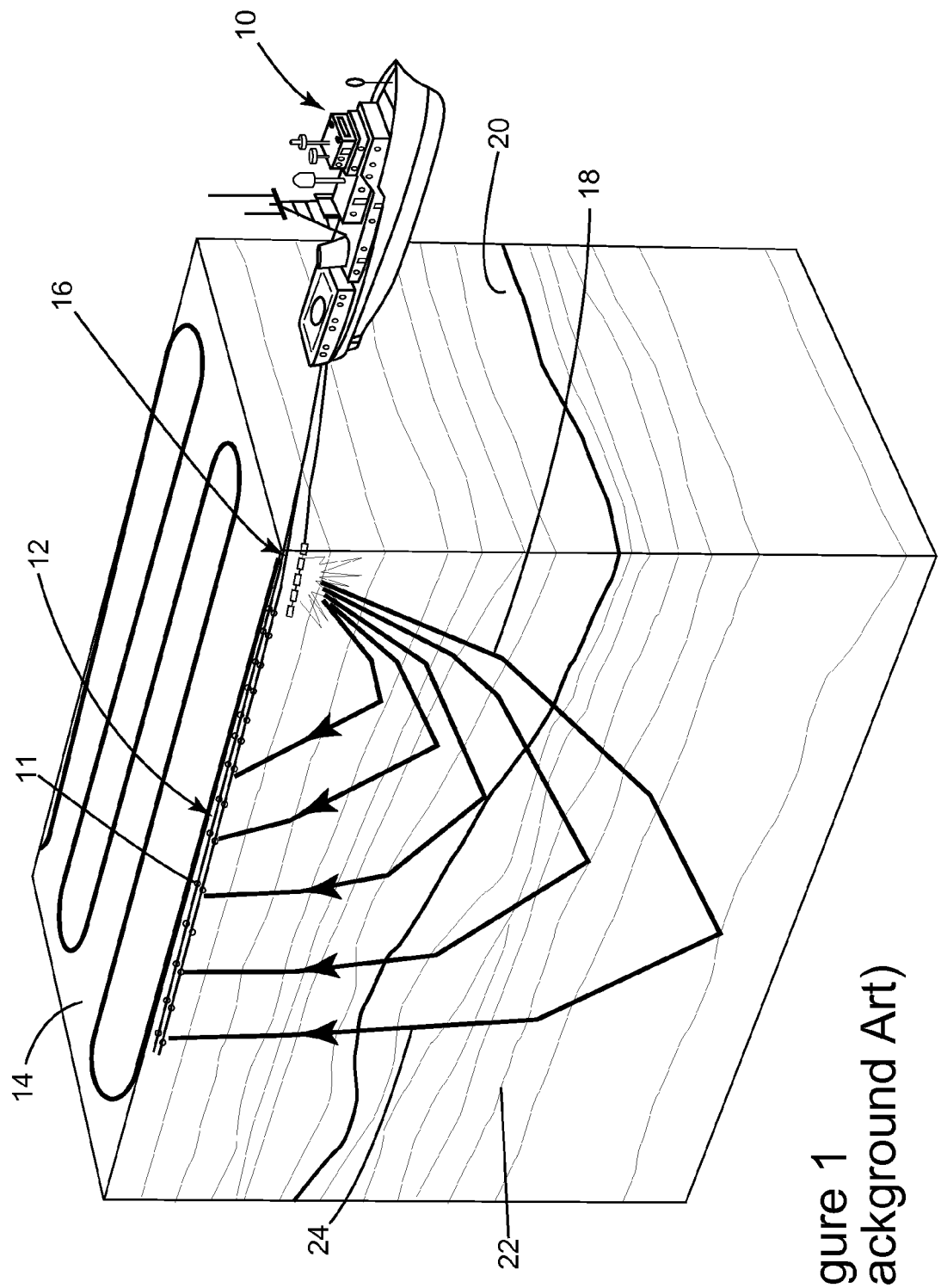
FIG. 1 is a schematic diagram of a conventional seismic survey system.
Figure 2:
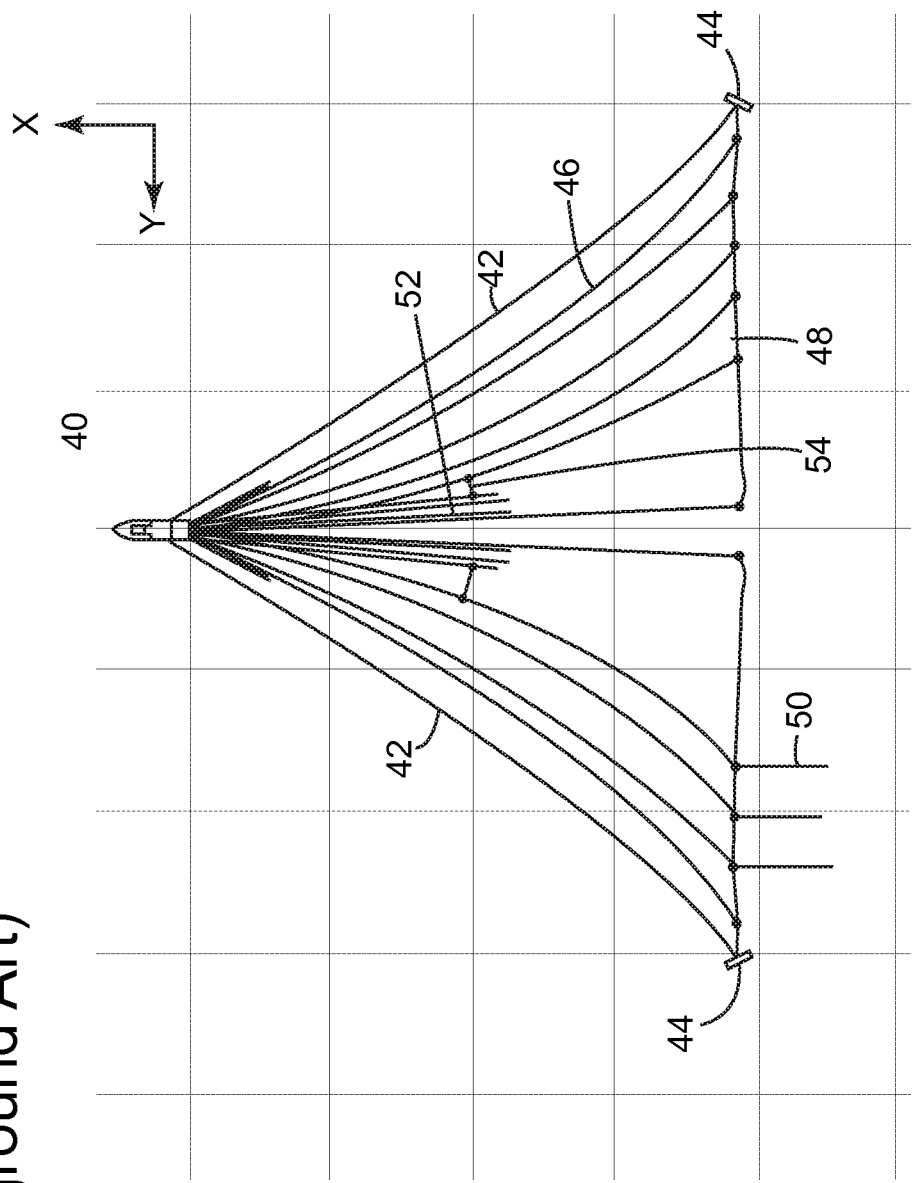
FIG. 2 illustrates a traditional arrangement of streamers and source arrays towed by a vessel.
Figure 3:
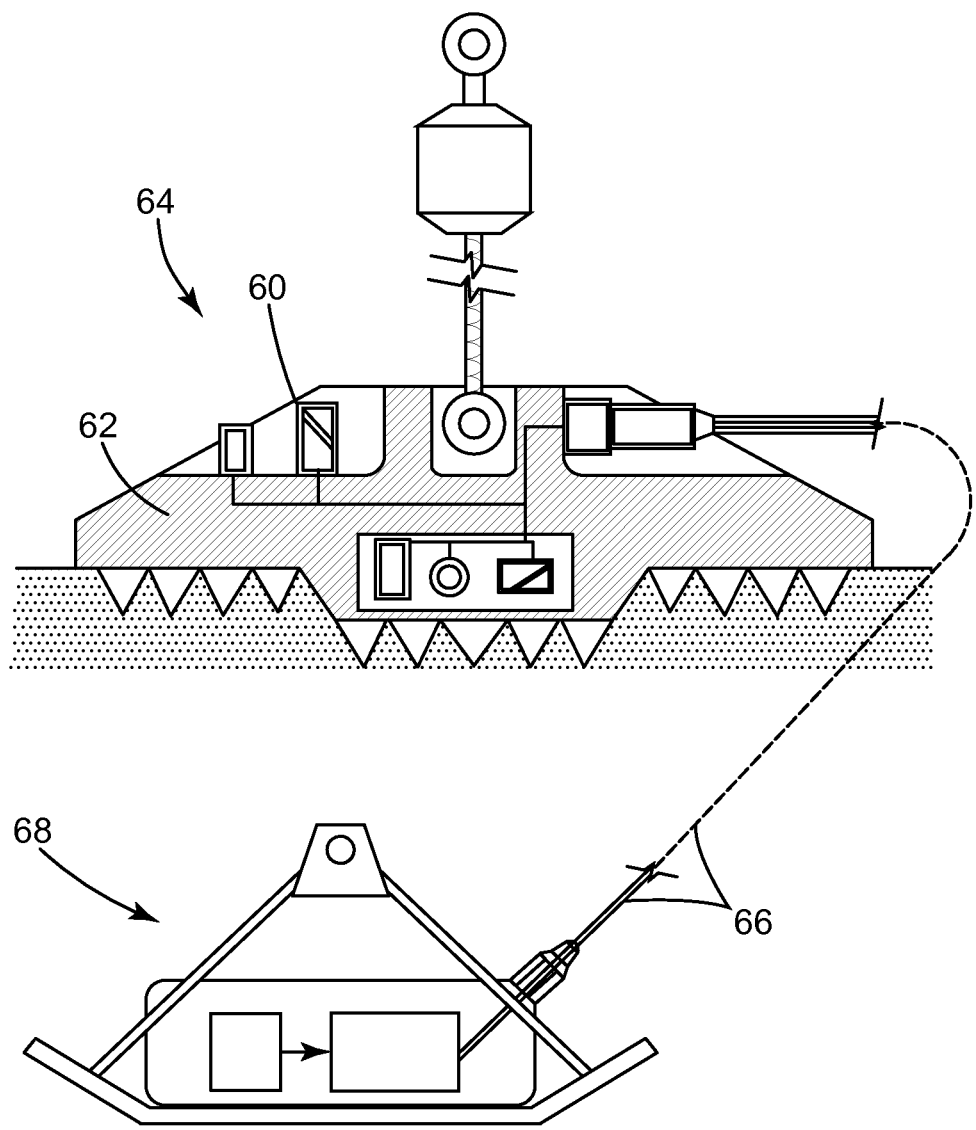
FIG. 3 is a schematic diagram of a station that may be positioned on the bottom of the ocean for seismic data recording.
Figure 4:
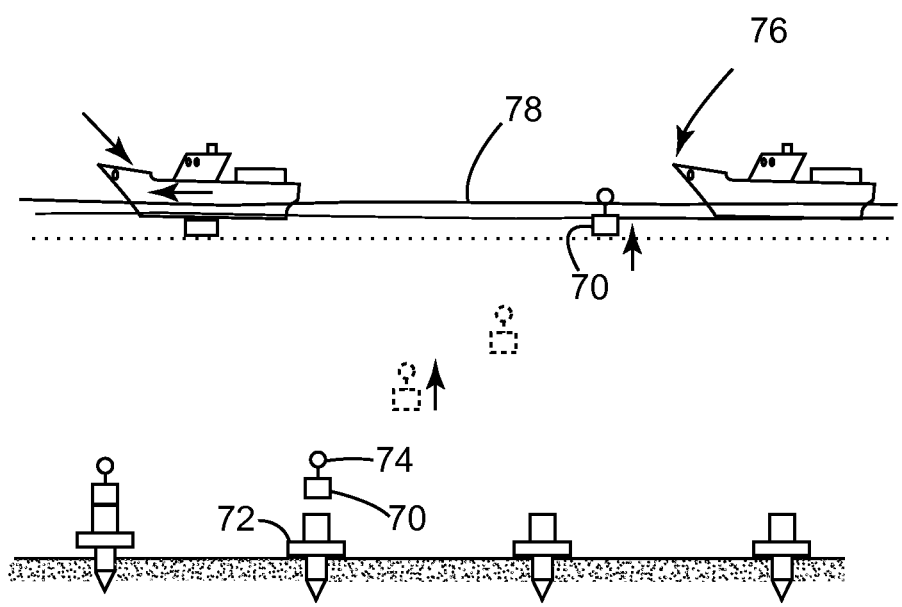
FIG. 4 is a schematic diagram of another station that may be positioned on the bottom of the ocean for seismic data recording.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vessel configured to deploy and recover an AUV. However, the embodiments to be discussed next are not limited to a vessel, but may be applied to other devices, e.g., platforms, gliders, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Emerging technologies in marine seismic surveys need an inexpensive system for deploying and retrieving seismic receivers at the bottom of the ocean. According to an exemplary embodiment, such a seismic system includes plural AUVs each having one or more seismic sensors. The seismic sensors may be one of a hydrophone, geophone, accelerometers, electromagnetic sensors, etc.

The AUV may be a specially designed device or an off-the-shelf device so that it is inexpensive. A deployment vessel stores the AUVs and launches them as necessary for the seismic survey. The AUVs find their desired positions (preprogrammed in their local control device) using, for example, an inertial navigation system.

As the deployment vessel is launching the AUVs, a shooting vessel may follow the deployment vessel for generating seismic waves. The shooting vessel may tow one or more seismic source arrays. The shooting vessel may then instruct selected AUVs to resurface so that they can be collected. In one embodiment, the deployment vessel also tows source arrays and shoots them as it deploys the AUVs. In still another exemplary embodiment, only the deployment vessel is configured to retrieve the AUVs. However, it is possible that only the shooting vessel is configured to retrieve the AUVs.

In one exemplary embodiment, the number of AUVs is in the thousands. Thus, the deployment vessel is configured to hold all of them at the beginning of the survey and then to launch the AUVs as the seismic survey is advancing. If the shooting vessel is configured to retrieve the AUVs, when the number of available AUVs at the deployment vessel is below a predetermined threshold, the shooting vessel and the deployment vessel are instructed to switch positions in the middle of the seismic survey.

In an exemplary embodiment, the seismic survey is performed with the seismic sensors of the AUVs and also with seismic sensors of streamers towed by the deployment vessel, or the shooting vessel or by both of them.

In still another exemplary embodiment, when selected AUVs are instructed to surface, they may be programmed to move to a desired rendezvous point where they will be collected by the shooting, deployment or recovery vessel. The selected AUVs may be chosen to belong to a given row or column if a row and column arrangement is used. The shooting or/and deployment or/and recovery vessel may be configured to send acoustic signals to the returning AUVs for guiding them to the desired position. The AUVs may be configured to go to a given altitude, follow the return back path at that altitude and then surface for being recovered. In one exemplary embodiment, the AUVs are configured to communicate among them so that they follow each other in their path back to the deployment vessel or they communicate among them to establish a queuing line for being retrieved by the shooting or deployment or recovery vessel.

Once on the vessel, the AUVs are checked for problems, their batteries may be recharged or replaced and the stored seismic data may be transferred for processing. After this maintenance phase, the AUVs are again deployed as the seismic survey continues. Thus, in one exemplary embodiment the AUVs are continuously deployed and retrieved. In still another exemplary embodiment, the AUVs are configured to not transmit the seismic data to the deployment or shooting vessel while being underwater. This may be advantageous as the available electric power is limited. In another exemplary embodiment, each AUV has enough electric power (stored in the battery) to only be once deployed, record seismic data and resurface to be retrieved. Thus, reducing the data transmission between the AUV and the vessel conserves the power and allows the AUV to be retrieved on the vessel before running out of battery.

Figure 5:
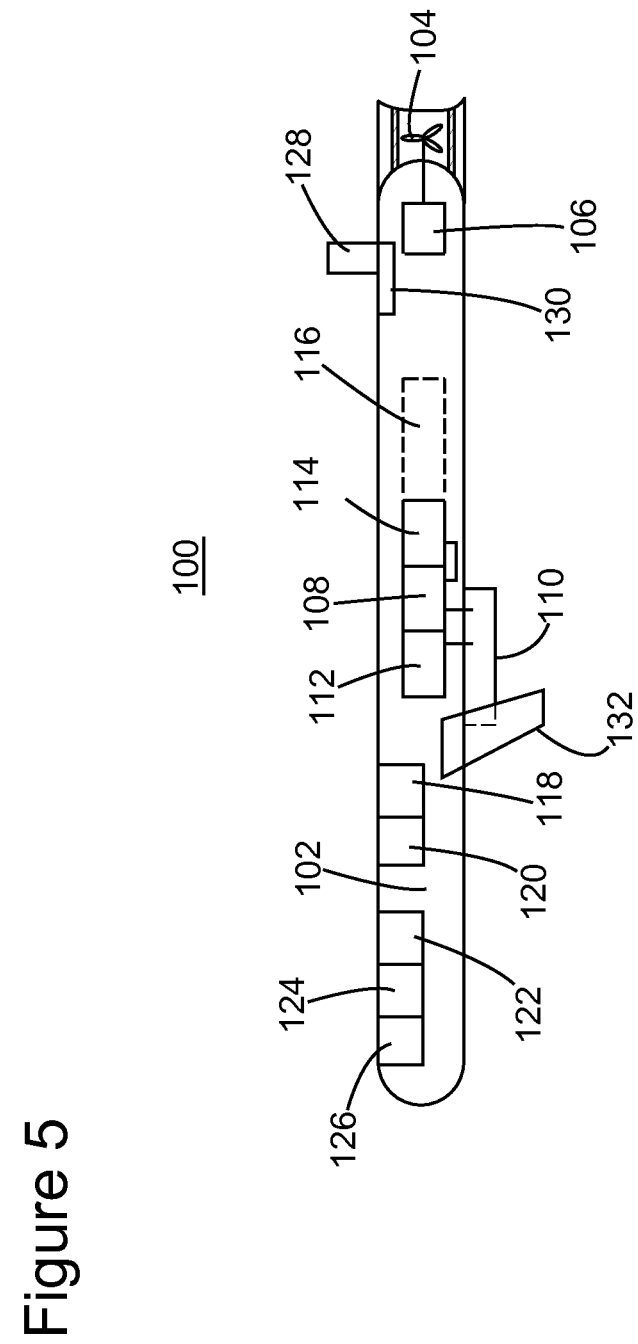
FIG. 5 is a schematic diagram of an AUV according to an exemplary embodiment.

The above-noted embodiments are now discussed in more detail with regard to the figures. FIG. 5 illustrates an AUV 100 having a body 102 to which a propeller 104 is attached. A motor 106 is provided inside the body 102 for activating the propeller 104. The motor 106 may be controlled by a processor 108. The processor 108 may also be connected to a seismic sensor 110. The seismic sensor 110 may have such a shape that when the AUV lands on the seabed, the seismic sensor achieves a good coupling with the seabed sediments. The seismic sensor may include one or more of a hydrophone, geophone, accelerometer, etc. For example, if a 4C (four component) survey is desired, the seismic sensor 110 includes three accelerometers and a hydrophone, i.e., a total of four sensors. Alternatively, the seismic sensor may include three geophones and a hydrophone. Of course other combinations of sensors are possible.

A memory unit 112 may be connected to the processor 108 and/or the seismic sensor 110 for storing seismic data recorded by the seismic sensor 110. A battery 114 may be used to power up all these components. The battery 114 may be allowed to change its position along a track 116 to change a center of gravity of the AUV.

The AUV may also include an inertial navigation system (INS) 118 configured to guide the AUV to a desired location. An inertial navigation system includes at least a module containing accelerometers, gyroscopes, or other motion-sensing devices. The INS is initially provided with its position and velocity from another source, for example, a human operator, another INS from the vessel, a GPS satellite receiver, etc., and thereafter computes its own updated position and velocity by integrating information received from its motion sensors. The advantage of an INS is that it requires no external references in order to determine its position, orientation, or velocity once it has been initialized. However, the INS may be configured to receive external data to improve its accuracy.

An INS can detect a change in its geographic position (a move east or north, for example), a change in its velocity (speed and direction of movement), and a change in its orientation (rotation about an axis). It does this by measuring the linear and angular accelerations applied to the system. Thus, it requires no external reference (after initialization).

Besides the INS 118, the AUV may include a compass 120 and other sensors 122, as for example, an altimeter for measuring its depth, a pressure gauge, an interrogator module, etc. The AUV 100 may optionally include an obstacle avoidance system 124 and a wi-fi device 126. One or more of these elements may be linked to the processor 108. The AUV may further include an antenna 128 and a corresponding acoustic system 130 for communicating with the deploying, recovery or shooting vessel. Stabilizing fins and wings 132 for guiding the AUV to the desired position may be used. However, according to an exemplary embodiment, the AUV is designed to not have any part out of its skin, i.e., no fins, no wings, no antennas.

The acoustic system 130 may be an Ultra-short baseline (USBL) system, also sometimes known as Super Short Base Line (SSBL). This system uses a method of underwater acoustic positioning. A complete USBL system includes a transceiver, which is mounted on a pole under a vessel, and a transponder/responder on the AUV. A processor is used to calculate a position from the ranges and bearings measured by the transceiver. For example, an acoustic pulse is transmitted by the transceiver and detected by the subsea transponder, which replies with its own acoustic pulse. This return pulse is detected by the transceiver on the vessel. The time from the transmission of the initial acoustic pulse until the reply is detected and measured by the USBL system and is converted into a range. To calculate a subsea position, the USBL calculates both a range and an angle from the transceiver to the subsea AUV. Angles are measured by the transceiver, which contains an array of transducers. The transceiver head normally contains three or more transducers separated by a baseline of, e.g., 10 cm or less.

Figure 6:
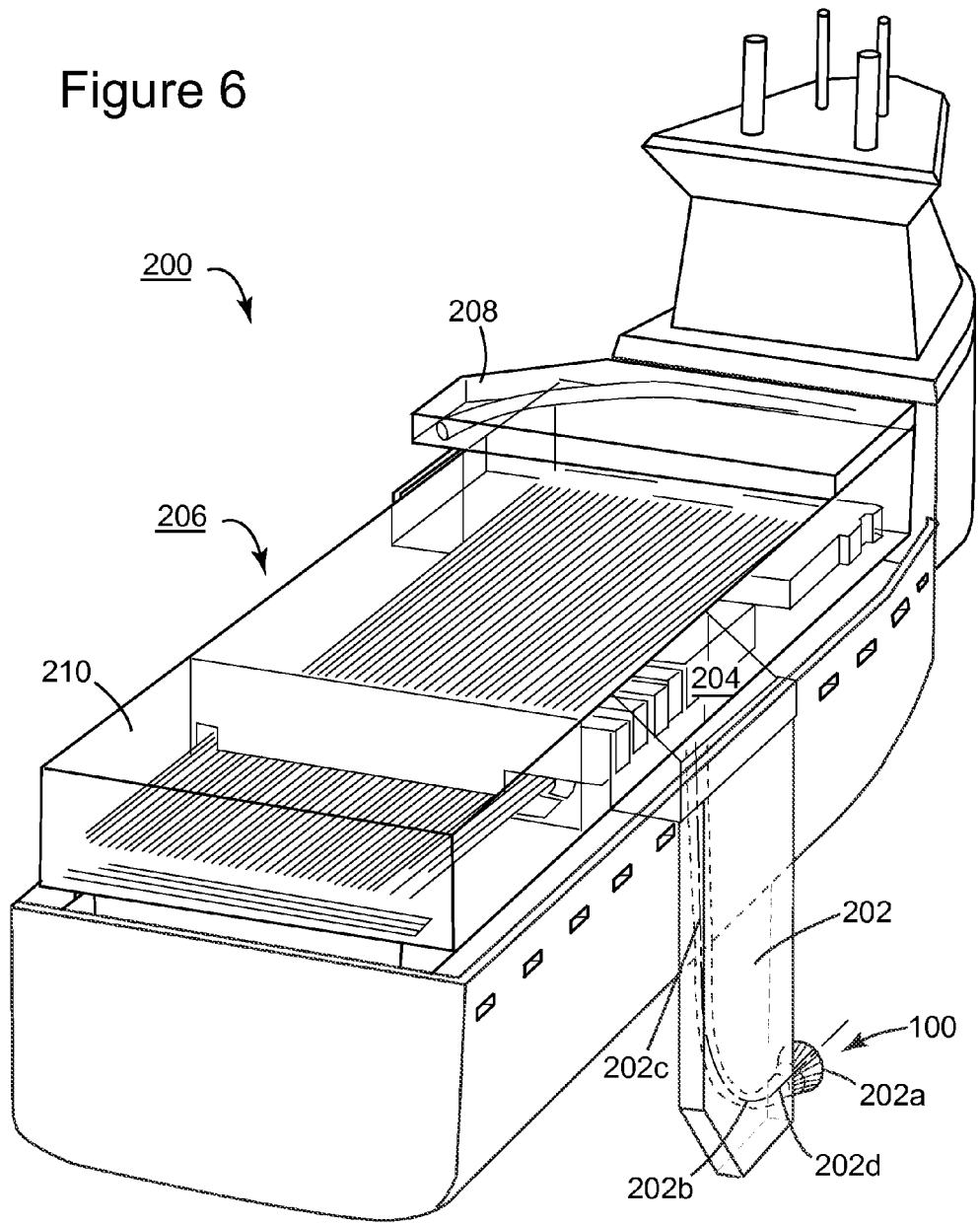
FIG. 6 is a schematic diagram of a vessel for deploying and recovering AUVs according to an exemplary embodiment.
Figure 7:
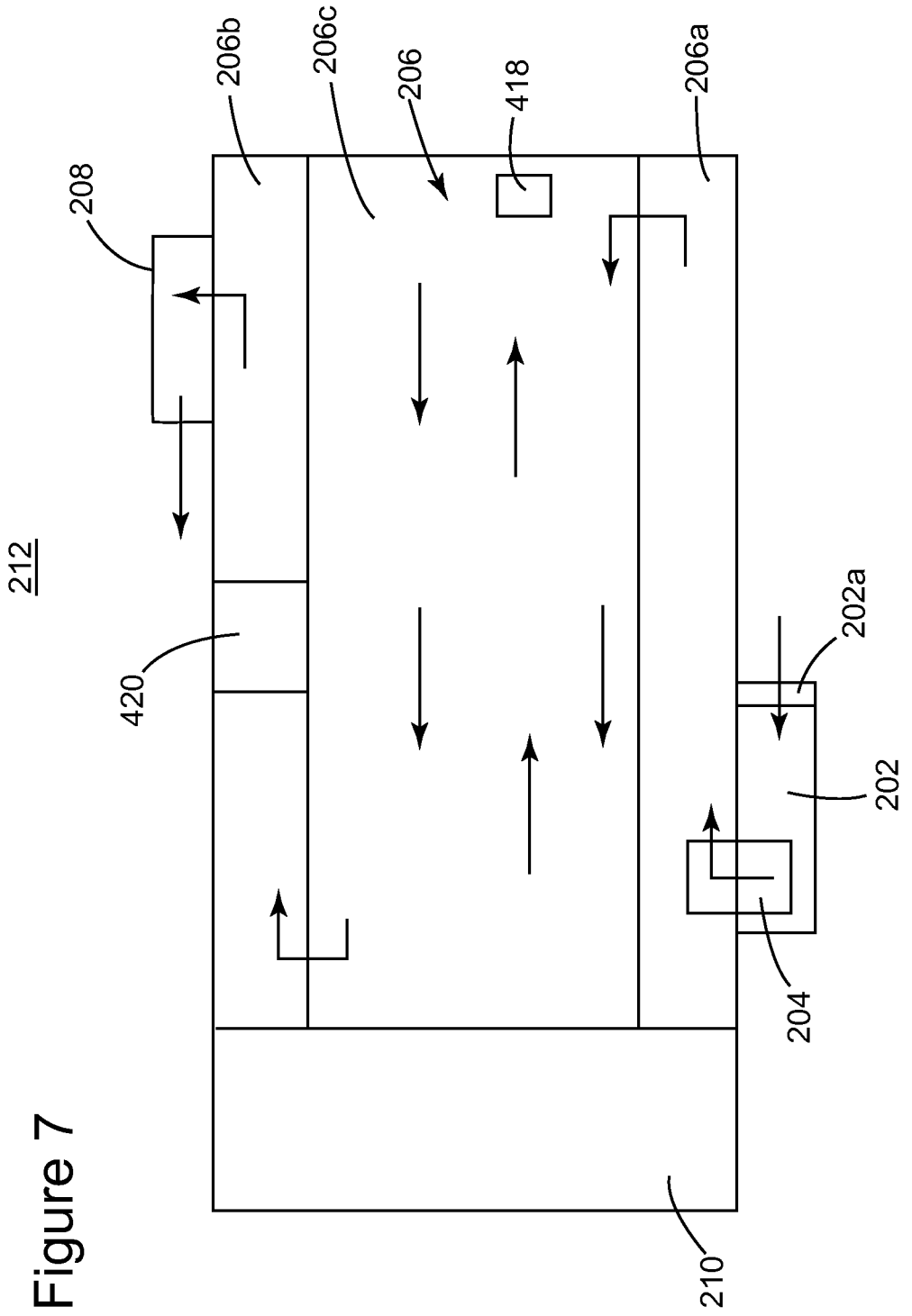
FIG. 7 is a schematic diagram of a management module for AUVs according to an exemplary embodiment.

FIG. 6 illustrates an exemplary embodiment in which a vessel 200 is configured to deploy and/or recover AUVs. The vessel 200 may include a recovery module 202. The recovery module 202 is configured to receive the AUV 100, when underwater or floating at the surface of the water, and to transfer it to a deck of the vessel. An end of the recovery module 202 may be provided underwater to receive the incoming AUVs while the other end may be provided in proximity to a transfer module 204 that is configured to receive the AUVs 100 from the recovery module 202 and to further deliver/transfer them to a main module 206. The main module 206 has multiple functions, as discussed later. After the AUV 100 passes tests performed at the main module 206, the AUV 100 may be provided to a launching module 208 for being launched again into the water. However, if for some reasons it is considered that the AUV failed some tests or there is no need to launch it again, the AUV 100 may be directed from the main module 206 to an additional module 210 or to a maintenance module 418 shown in FIG. 7. FIG. 7 also show a battery checking module 420 that is discussed later.

FIG. 7 illustrates a generic AUV management module 212 that includes the transfer module 204, the main module 206, the additional module 210, and the maintenance module 418. The management module 212 may be located on a back deck of the vessel. It is noted that this embodiment is illustrative only and not intended to narrow the applicability of the novel concepts disclosed herein only to a management module as shown in the figures. Those skills in the art will understand that the management module 212 may be modified, simplified, etc. as appropriate.

Returning to FIG. 7, it is noted that the recovery module 202 may be attached to a side of the vessel 200, as illustrated in FIG. 6. Under this scenario, the recovery module 202 may include a homing device 202a configured to receive the AUV 100. FIG. 6 shows the recovery module 202 also having a curved portion 202b configured to move/transfer the recovered AUV upwards toward the main module 206. Further, the recovery module 202 may include a vertical straight portion 202c, also shown in FIG. 6, for providing the AUV in a vertical position to the transfer module 204. Optionally, the recovery module 202 may include a horizontal straight portion 202d.

Figure 8A:
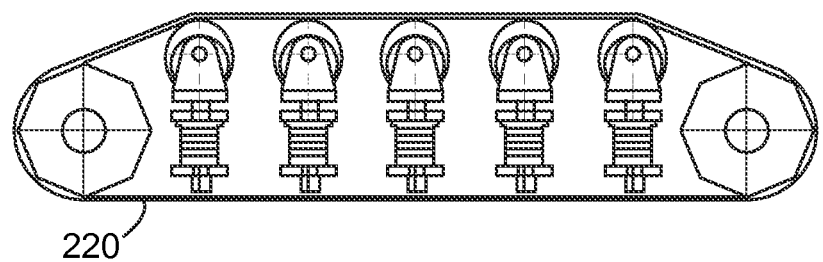
FIGS. 8A-B are schematic diagrams of a caterpillar system for handling AUVs according to an exemplary embodiment.
Figure 8B:
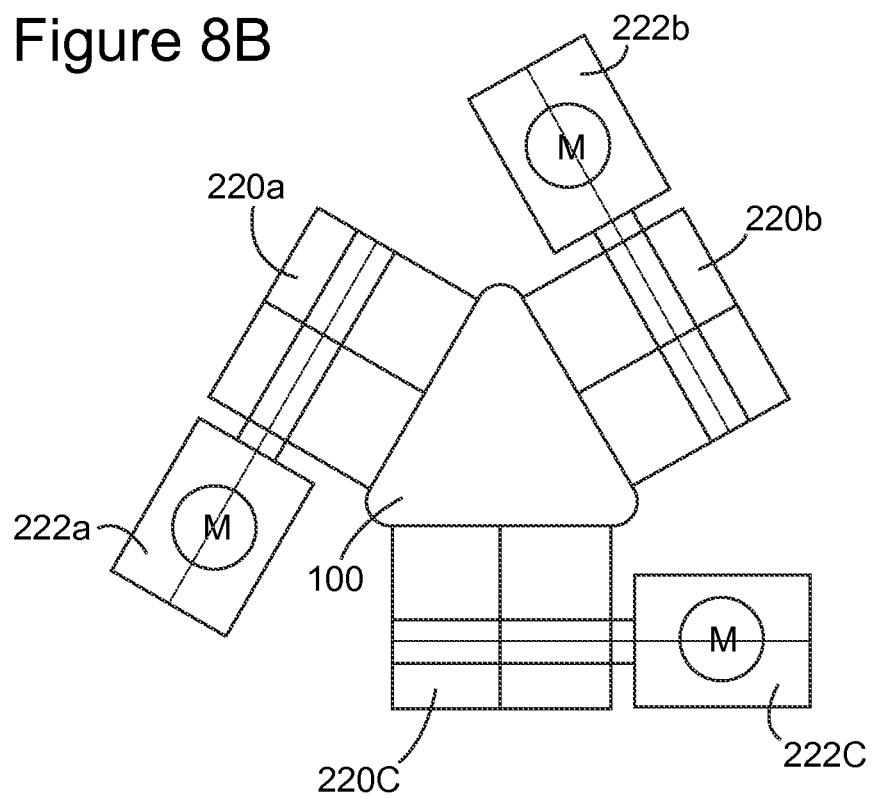
Figure 9A:
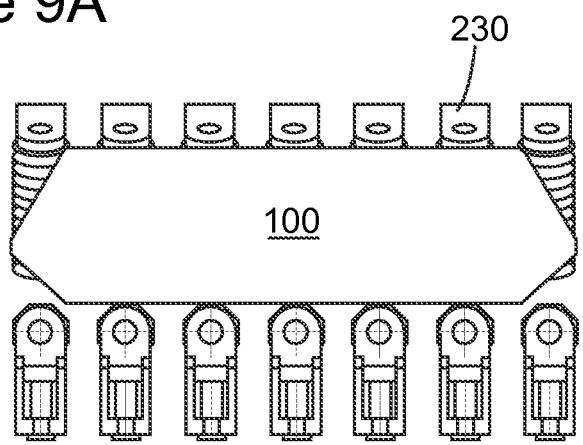
FIGS. 9A-B are schematic diagrams of a roller system for handling AUVs according to an exemplary embodiment.
Figure 9B:
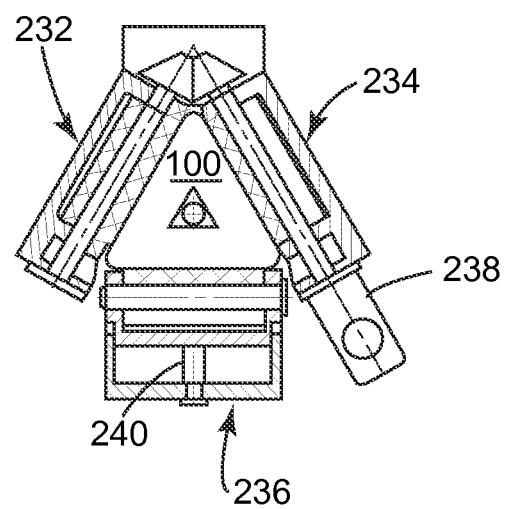

The curved and straight portions 202b-d may have various mechanisms for moving the AUVs. For example, all these portions may include caterpillar drives for driving the AUV upwards, from the water level to the deck level of the vessel. Other drives may be possible as would be recognized by those skilled in the art. A caterpillar drive 220 is illustrated in FIG. 8A. As a cross-section of the AUV 100 may have a triangular-like shape (i.e., a triangle cross-section with rounded corners), three caterpillar drives 220a-c may be provided in direct contact with each flat surface of the AUV 100 as shown in FIG. 8B. It is noted that the AUV may have other cross-section shapes and thus, the caterpillar drives will be changed accordingly. Corresponding motors 222a-c may be provided to control the caterpillars. The number of caterpillars depends on the cross-section of the AUV. An alternative embodiment is shown in FIGS. 9A and 9B in which rollers are used instead of caterpillars. FIG. 9A shows plural rollers 230 in contact with the AUV 100 while FIG. 9B shows powered rollers 232 and 234 and a pressure roller 236 pressing on the AUV 100. The powered rollers may be activated by a motor 238 to rotate and consequentially push the AUV 100 in the desired direction while the pressure roller 236 may have a spring mechanism 240 to apply a certain pressure on the AUV 100 so that all the rollers are in contact with the AUV 100. Other mechanisms and shapes may be imagined for handling the AUV 100.

Figure 10:
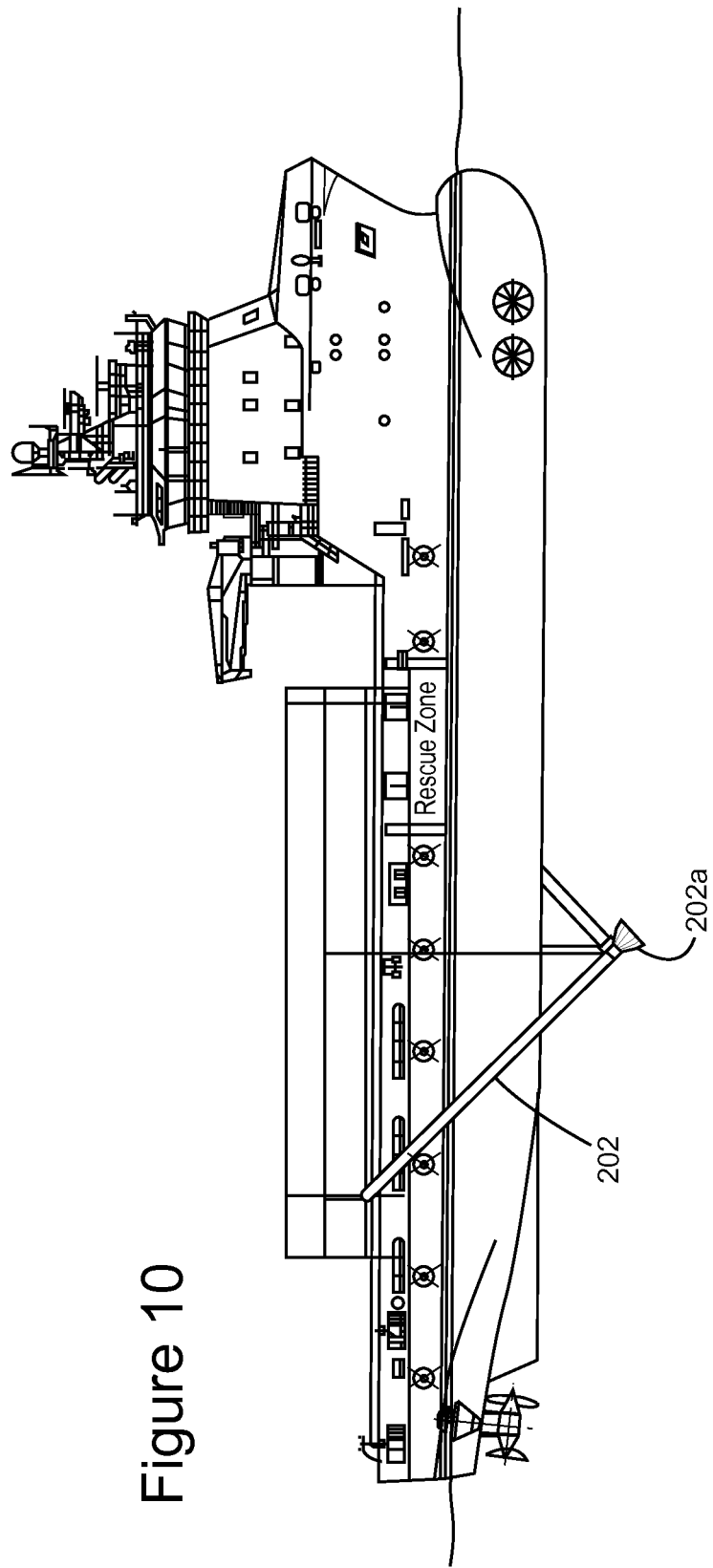
FIG. 10 is a schematic diagram of a straight recovery module according to an exemplary embodiment.
Figure 11:
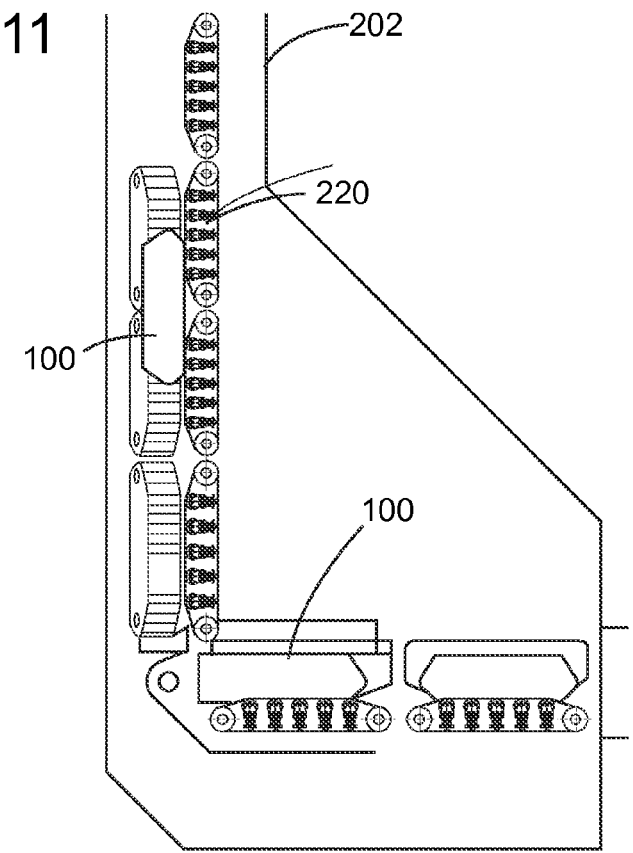
FIG. 11 is a schematic diagram of an L-shaped recovery module according to an exemplary embodiment.
Figure 12:
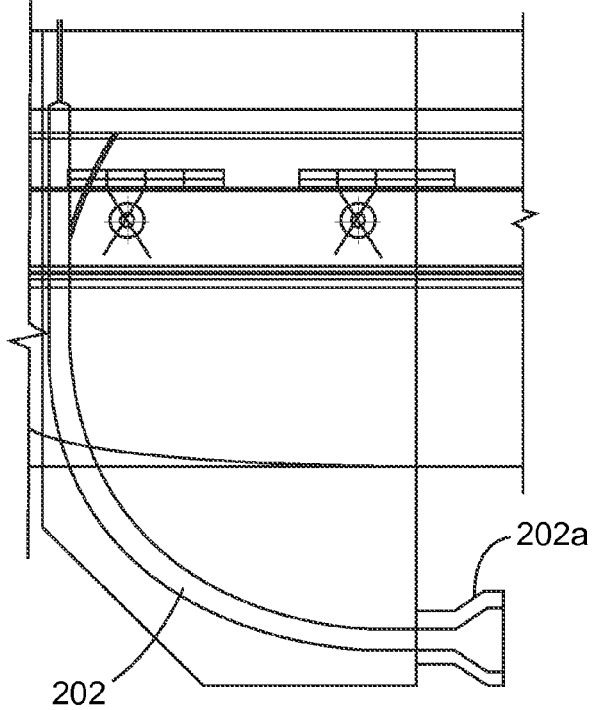
FIG. 12 is a schematic diagram of a curved recovery module according to an exemplary embodiment.

It is noted that the exemplary embodiments illustrated in FIGS. 7-9B do not have to have the recovery module 202 including a straight portion and a curved portion. For example, the recovery module may have only a straight portion as illustrated in FIG. 10 or an L-shape as illustrated in FIG. 11 or a vertical straight-curved-horizontal straight portion as illustrated in FIG. 12. The embodiment of FIG. 12 may have different drives, e.g., caterpillars in all portions or caterpillars in the vertical portion and water propulsion in the curved and horizontal portions. For some of these exemplary embodiments, a heave stabilizer mechanism may be provided to compensate for height movement of the homing device. This is so because the vessel moves up and down due to the waves and the homing device should stay in contact with the water at all times. The heave stabilizer mechanism may be provided in the vertical portion of the recovery module.

Figure 13:
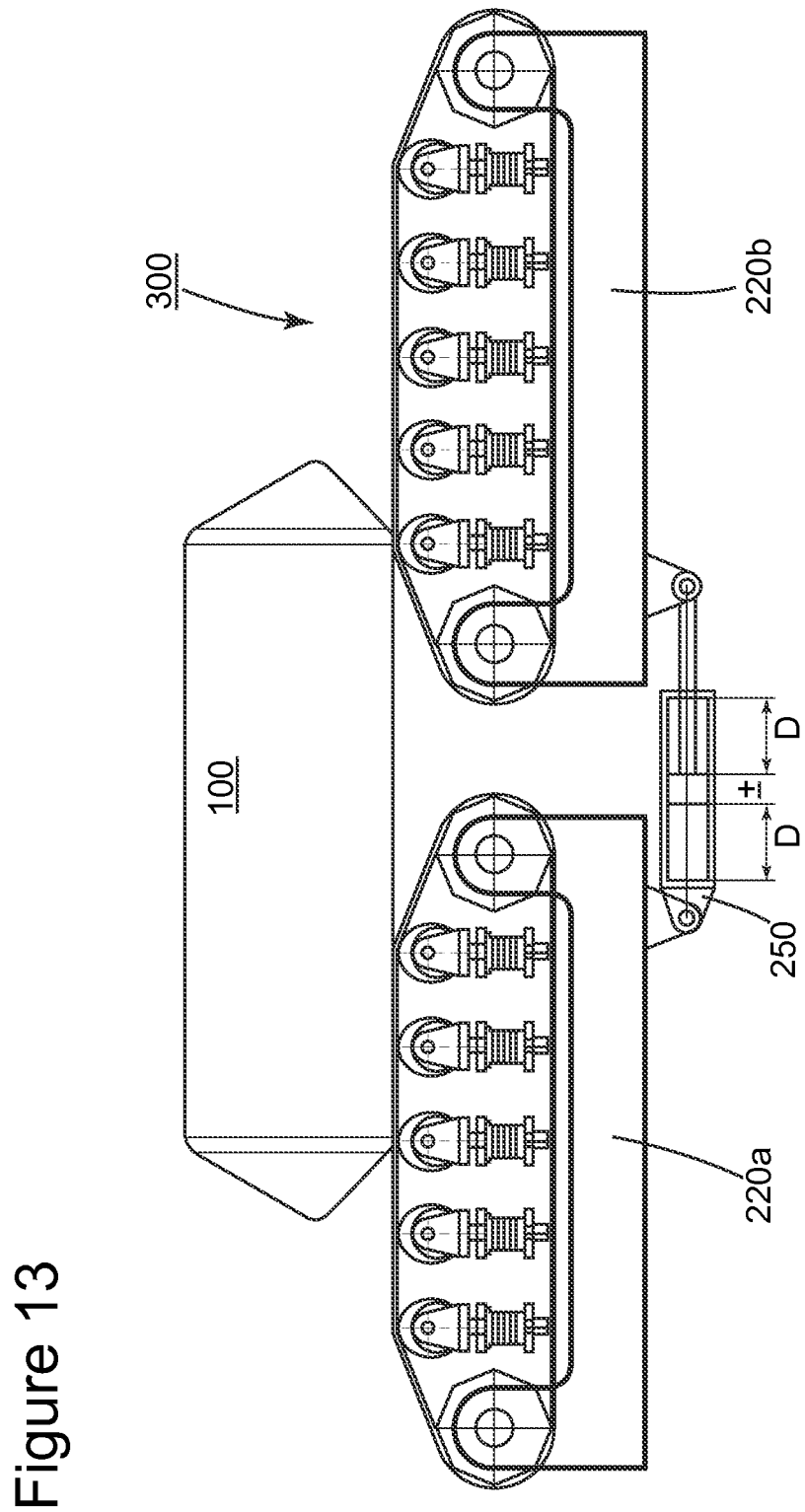
FIG. 13 is a schematic diagram of a heave compensation system according to an exemplary embodiment.

According to an exemplary embodiment illustrated in FIG. 13, a heave stabilizer mechanism 300 may include plural caterpillar drives. FIG. 13 shows only two caterpillar drives 220a and 220b connected to each other by a heave stabilizer module 250. The heave stabilizer module 250 may be configured to compensate for 2D, where D may be around 100 mm. It is desirable that a total compensation of the heave stabilizer mechanism 300 is around 1 m.

Figure 14:
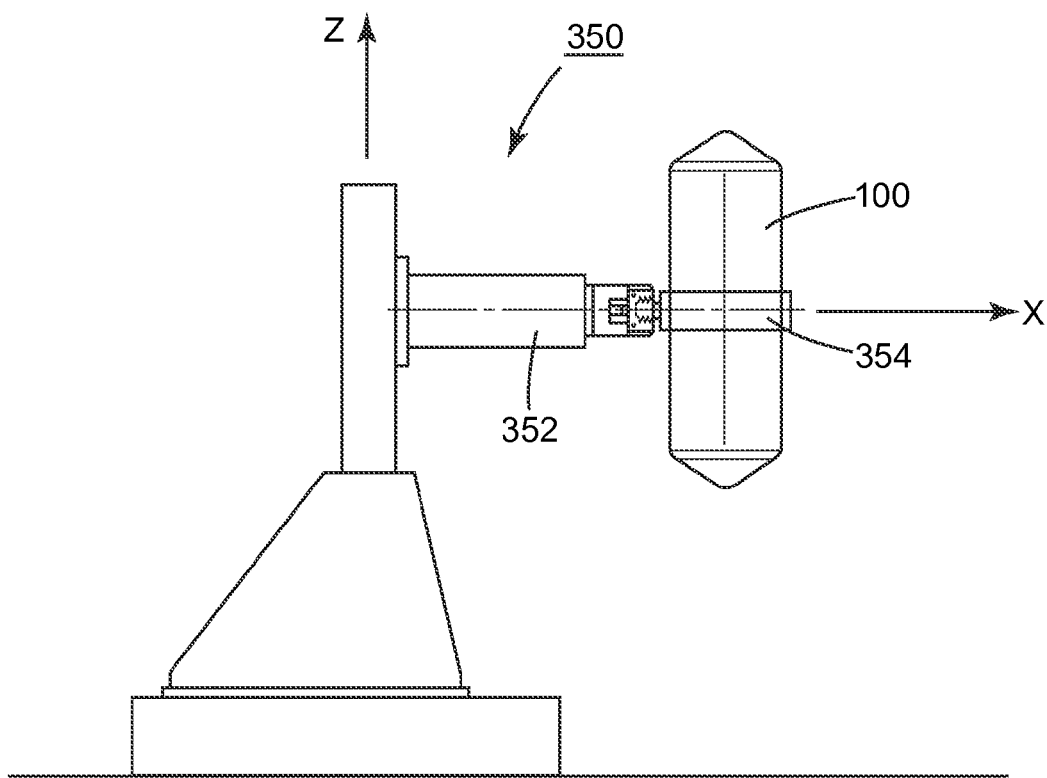
FIG. 14 is a schematic diagram of a transfer device according to an exemplary embodiment.

Returning to FIG. 7, the transfer module 204 is configured to transfer the AUV 100 from the recovery module 202 to the main module 206 and to ensure that the AUV 100 is in a vertical position. According to an exemplary embodiment illustrated in FIG. 14, the transfer module 204 may include a transfer device 350 that is configured to grab the AUV 100 provided by the recovery module 202 and transfer it to the main module 206. The transfer device 350 may have an arm 352 capable to rotate around an axis Z and also around an axis X as necessary. The arm 352 may have two or more claws 354 for grabbing the AUV 100 and positioning it at a desired position.

While at the main module 206, as illustrated in FIG. 7, the AUV may follow various routes (see arrows in FIG. 7). These routes and a possible implementation of the main module 206 are now discussed in more detail. The main module 206 may be divided into management zones 206a and b and a main storage/conveyor zone 206c. In one application, the main storage/conveyor zone 206c may be configured to convey and/or hold around 1500 AUVs.

Figure 15:
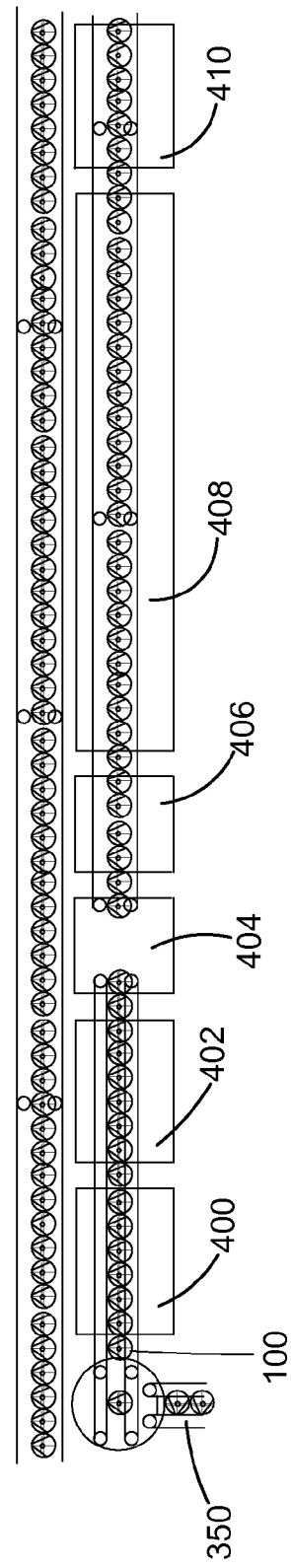
FIG. 15 is a schematic diagram of a management zone on a vessel according to an exemplary embodiment.

In one exemplary embodiment, the management zone 206a, located between the recovery module 202 and the main storage/conveyor zone 206c, may be configured to have, as shown in FIG. 15, a washing mechanism 400 for washing the AUV 100, a drying mechanism 402 for drying the AUV 100, an orientation mechanism 404 for ensuring the correct orientation of the AUVs, an air supply source 406 for supplying compressed air to an air accumulator if the AUV has one, a data downloading mechanism 408 for collecting the data recorded by the AUV using, for example, a wireless interface, and a geometry/shape checking mechanism 410 for determining whether the AUV is damaged or not. It is noted that one or more of the mechanisms discussed herein may be optional.

Figure 16:
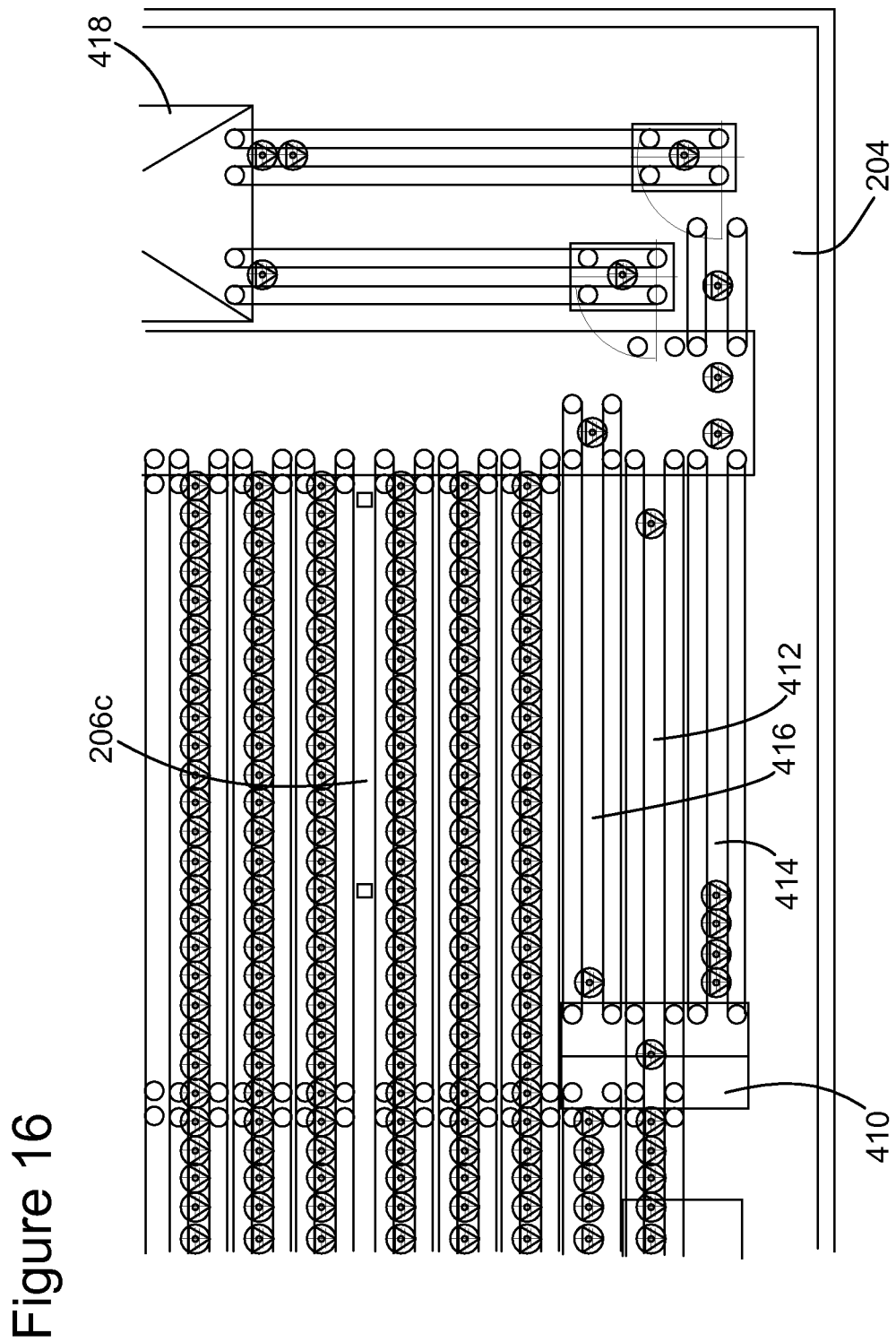
FIG. 16 is a schematic diagram of a path selection mechanism according to an exemplary embodiment.

The geometry/shape checking mechanism 410 may be equipped with cameras and sensors for determining the integrity of the AUV. If this mechanism determines that an AUV is damaged, that AUV needs to be replaced by a new one, which may be stored in the additional module 210 or a maintenance module 418. Thus, the geometry/shape checking mechanism 410 may decide to move an incoming AUV to a faulty line 412 and bring a new AUV from a new line 414 as illustrated in FIG. 16. The faulty and new lines 412 and 414 may be connected to the AUV maintenance area 418 where the faulty AUVs may be taken for repairs. If the AUV is not faulty, it will follow a by-pass line 416 to enter the main storage/conveyor zone 206c. It is noted that various mechanisms, as will be discussed later, may be used to transport the AUVs through all these areas.

The other management zone 206b shown in FIG. 7 may be provided with a battery checking mechanism 420 for checking whether the battery of each AUV, before launching, has been recharged. The battery checking mechanism 420 is configured to send the AUVs having the batteries charged to the launching module 208 while the AUVs having batteries not fully charged are sent back for recharging.

Figure 17:
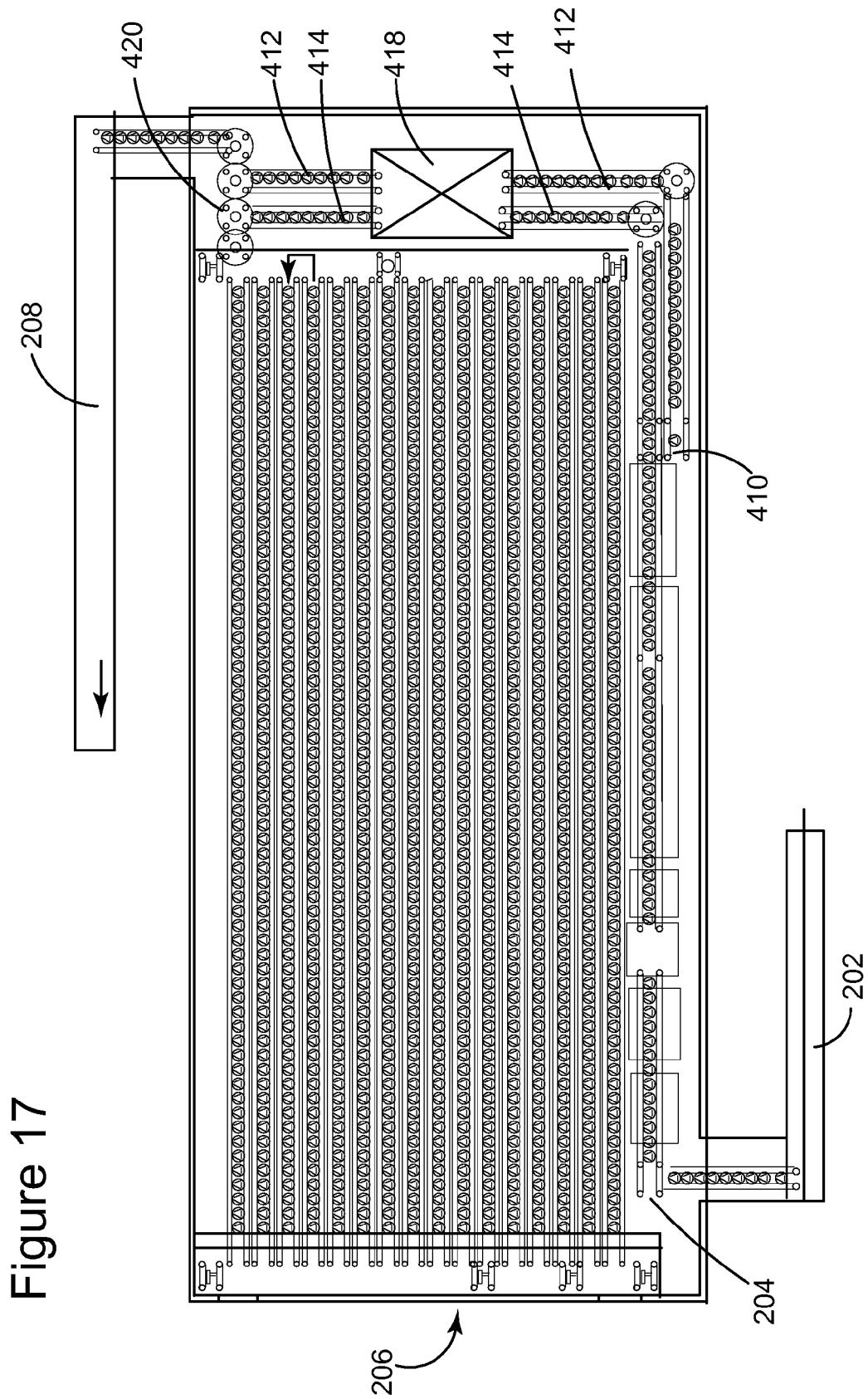
FIG. 17 is a schematic diagram of a serial AUVs path on a deck of a vessel according to an exemplary embodiment.

The main storage/conveyor zone 206c may have serial or parallel conveyors for handling the AUVs. FIG. 17 illustrates a serial conveyor in which the AUVs advance along a single path, in a one way direction. Faulty AUVs are detected at the geometry/shape checking mechanism 410 or at the battery checking mechanism 420 and returned to the AUV maintenance area 418. Thus, all the AUVs in the main storage/conveyor zone 206c in the serial embodiment are stored on a single line.

Figure 18:
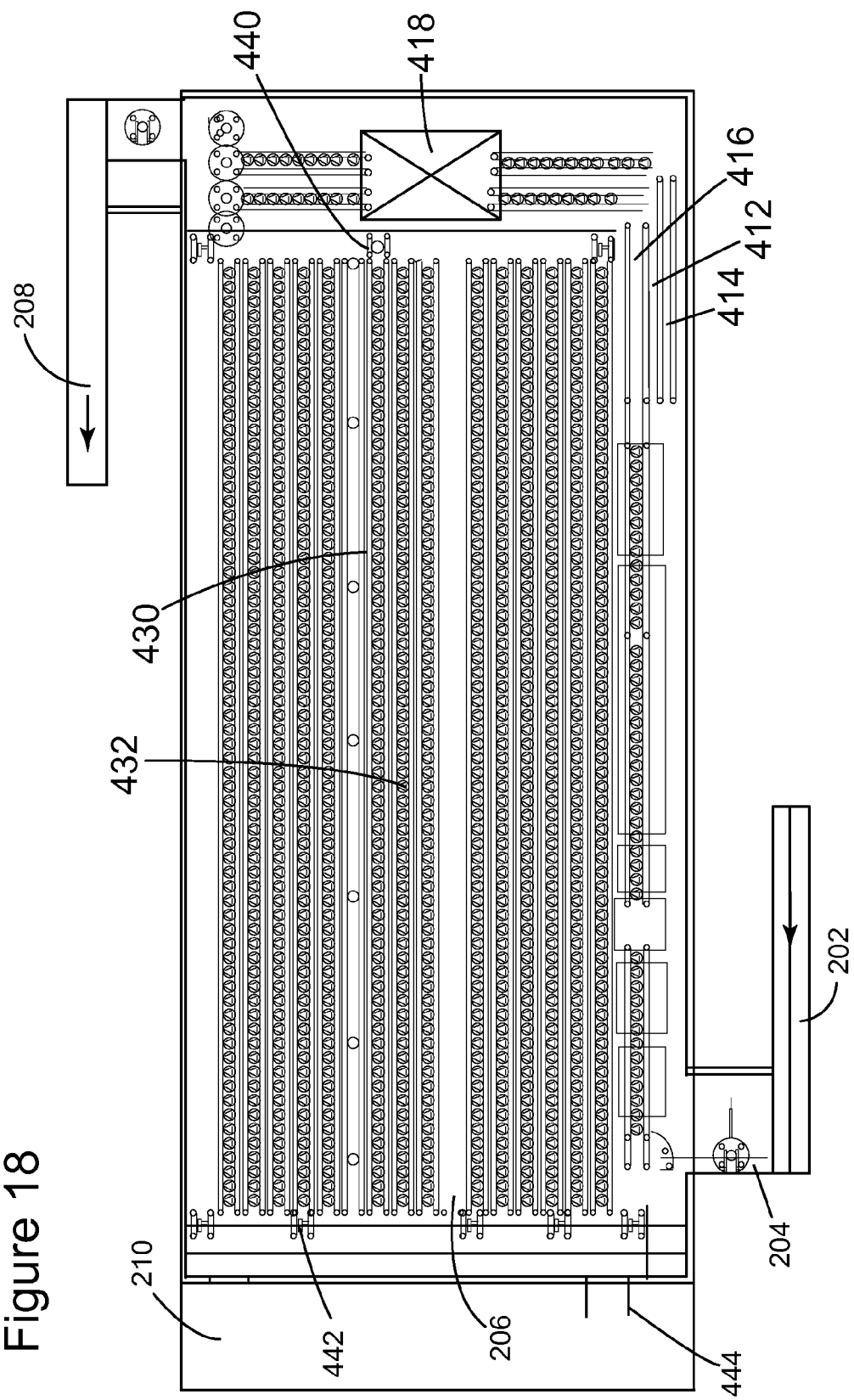
FIG. 18 is a schematic diagram of a parallel AUVs path on a deck of a vessel according to an exemplary embodiment.

For the parallel embodiment, FIG. 18 shows parallel lines 430 and 432 of AUVs and one or more of movable arms 440 for distributing the incoming AUVs to the various parallel lines. The movable arm 440 may move to the management zone 206a to pick up the AUV and then moves it to an appropriate line where it releases the AUV. A second movable arm 442 may be provided at the other end of the parallel lines for picking up an AUV and delivering it to the launching line or to an inlet 444 of the additional module 210 as required.

Figure 19:
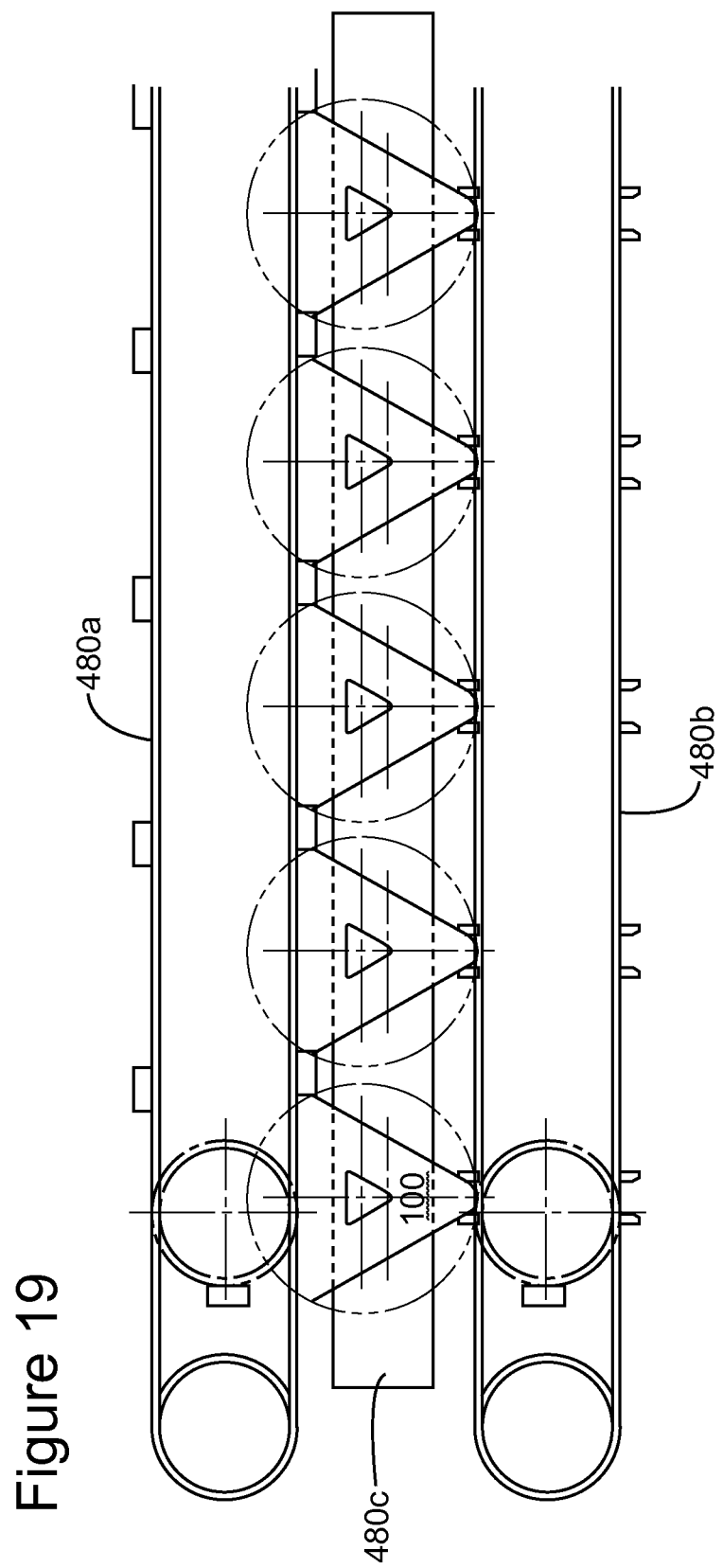
FIG. 19 is a schematic diagram of a transportation system for the AUVs according to an exemplary embodiment.
Figure 20A:
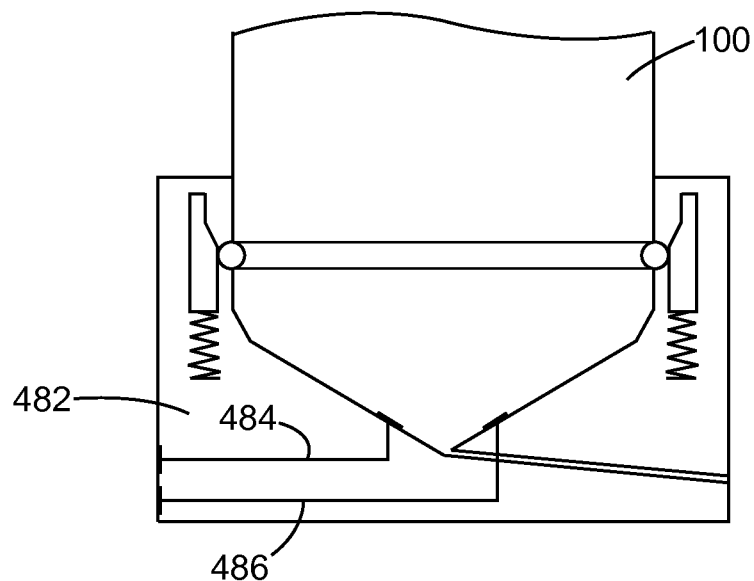
FIGS. 20A and B are schematic diagrams of a base pad for supporting AUVs according to an exemplary embodiment.
Figure 20B:
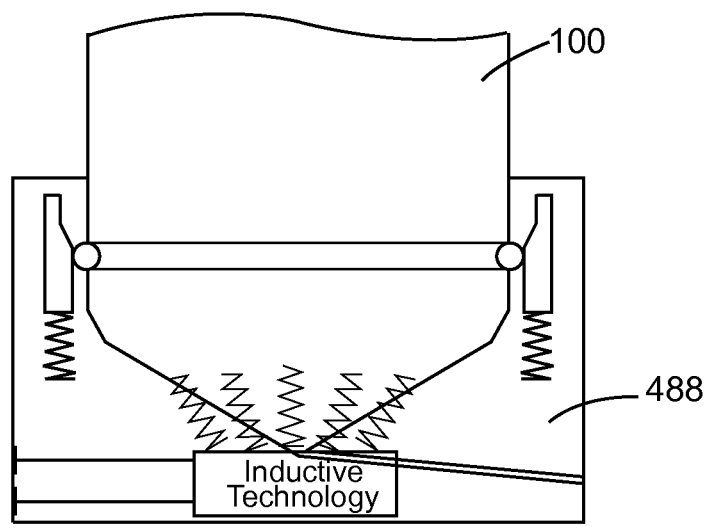
Figure 21:
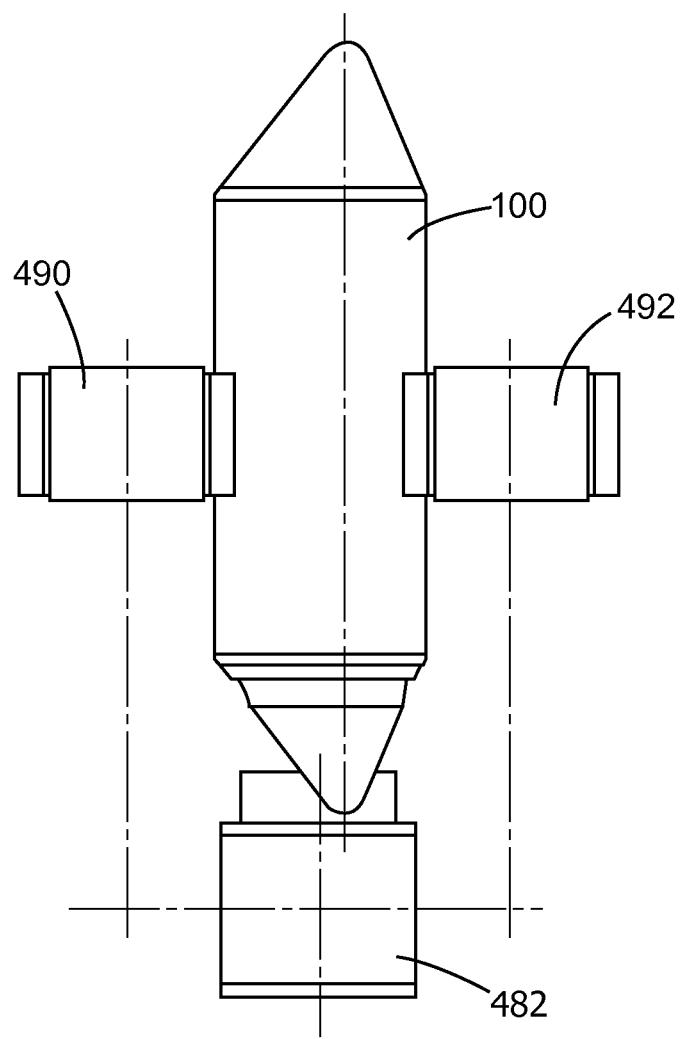
FIG. 21 is a schematic diagram of a caterpillar system for handling AUVs according to an exemplary embodiment.

The AUVs may be handled in different ways while moving through the management module 212. For example, a system of caterpillars may be used to grip each AUV as shown in FIG. 19. In this embodiment, each AUV 100 is contacted by three moving conveyors 480*a-c*. Conveyors 480*a-b* may laterally contact the AUVs while conveyor 480*c* contacts a base of the AUVs. The conveyors have appropriate pads for maintaining the AUVs in the desired direction. The base conveyor 480*c* may have appropriate circuitry for charging the battery or batteries of the AUV. FIG. 20A shows a pad 482 for charging the battery of the AUV by direct contact, i.e., using wires 484 and 486, while FIG. 20B shows a pad 488 for inductively charging the battery of the AUV. Other pads may be used. FIG. 21 shows pads 482, 490, and 492 of the three conveyors in a side view.

Figure 22:
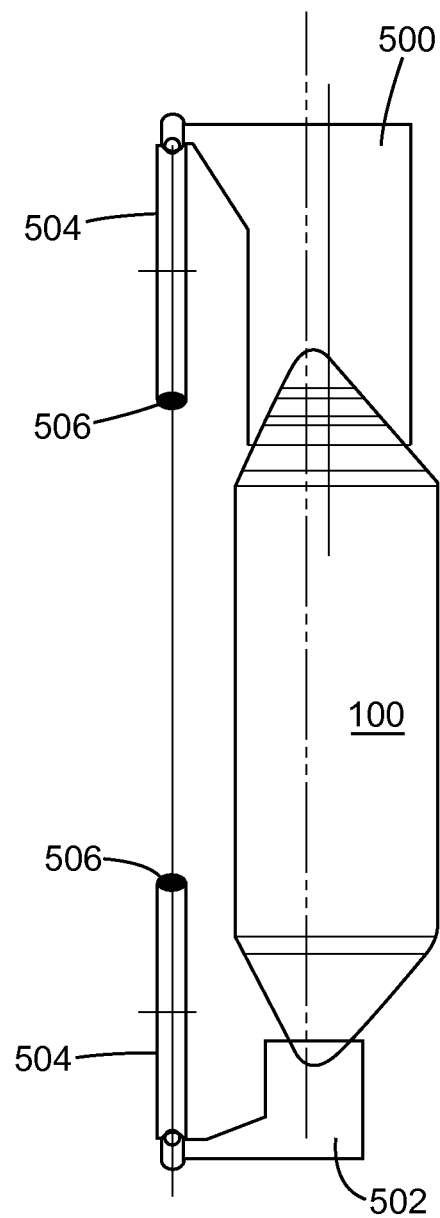
FIG. 22 is a schematic diagram of a cable system for handling AUVs according to an exemplary embodiment.

The embodiments discussed above are exemplary and not intended to limit the applicability of the novel concepts. For example, instead of handling the AUV in the management module by using caterpillars with pads as discussed with reference to FIGS. 19-21, it is possible to use a cable and gripper system as discussed next. FIG. 22 shows the AUV 100 being hold between a top gripper 500 and a base support 502. The base support 502 may be configured to charge the battery of the AUV 100, similar to the embodiments illustrated in FIGS. 20A and 20B. The top gripper and base support may be connected to corresponding elements 504 that are attached to cables 506 and configured to move along serial or parallel paths as discussed with regard to the main module 206. All the elements that form the management module 212 may be provided on a back deck of the vessel. In one exemplary embodiment, the management module 212 may be distributed on multiple levels, stacked on top of each other and attached to the back deck of the vessel.

Figure 23:
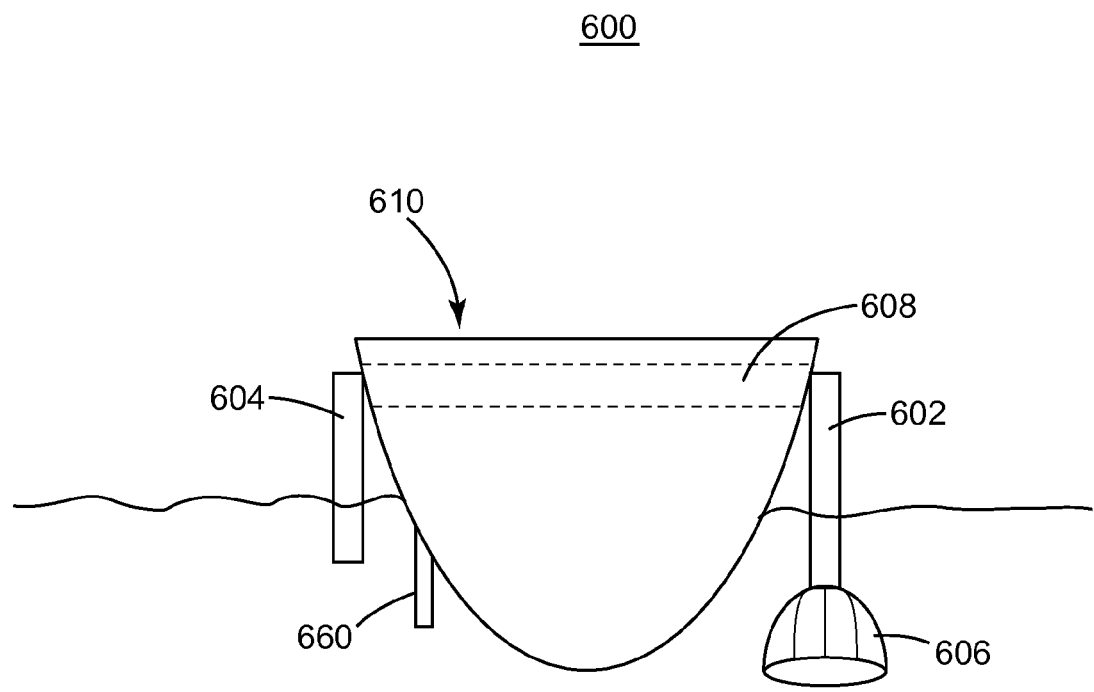
FIG. 23 is a schematic diagram of a vessel for deploying and recovering AUVs according to an exemplary embodiment.
Figure 24:
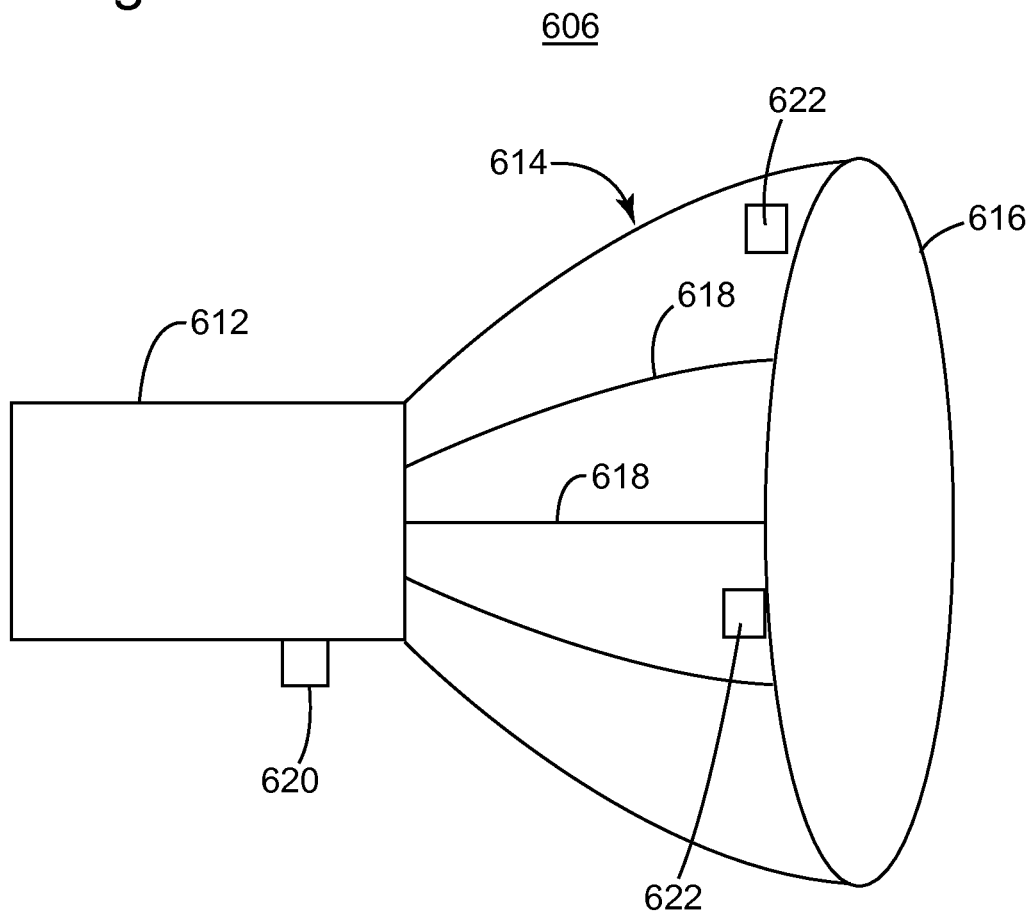
FIG. 24 is a schematic diagram of a homing device according to an exemplary embodiment.

The recovery vessel 200 may be also used as a deployment vessel. For example, as illustrated in FIG. 23, a vessel 600 may have a recovery device 602 on one side of the vessel and a launching device 604 on another side of the vessel. Thus, the vessel 600 may recover, recondition and launch AUVs at the same time in one single trip. It is noted that all these operations may be performed while the vessel is moving, i.e., there is no need to stop the vessel when recovering or launching AUVs. The recovery device 602 may include a homing device 606 for guiding the AUV to the vessel. FIG. 23 shows the recovery and launching devices communicating with an inside region 608 of the vessel. In this case, the AUVs are traveling through the inside region 608 for maintenance and other operations discussed above. However, the AUVs may be handled on a back deck 610 of the vessel, as already discussed.

The homing device 606 may be attached to the end of the recovery module 202 shown in FIGS. 6 and 7. In one application illustrated in FIG. 10, the homing device 606 includes a body 612 and a chute 614. The chute 614 may include a ring 616 connected via multiple beams 618 to the body 612. The body 612 may include a propulsion mechanism 620 for adjusting a position of the homing device 606 underwater. In addition, the homing device may include various systems 622 (e.g., pingers or beacons) for guiding the AUV to the chute 614.

The homing device 606 is attached to the recovery module 202 in such a way to form a continuous path for an incoming AUV 100. After engaging the recovery module 202 (based on the information provided by the homing device 606), the AUV 100 is brought up on the deck of the vessel. As noted above, this embodiment discusses the case in which the AUVs are handled on the deck of the vessel. However, the AUVs may be handled inside the vessel in a similar way.

While the AUVs are transitioning from the recovery module 202 to the launching module 208, they may experience various operations. For example, the battery of the AUV may be recharged or replaced, the recorded seismic data may be downloaded, for example, through a wi-fi interface to the vessel. Alternatively, a storage device storing the data may be removed from the AUV and a new, empty storage device may be added to the AUV. Another possibility is to connect a data cable to the AUV and transfer the data. The various systems (e.g., propulsion system) of the AUV may also be checked for errors. These processes may happen as the AUV travels towards the launching module. Once the AUV arrives at the launching module, it is considered that all the checks have been passed and the AUV is ready to be deployed. Otherwise, the AUV is removed to the maintenance zone.

Assuming that the AUV has passed all the tests, it is sent to the launching module 208 for launching. The launching module 208 may be similar to the recovery module 202, i.e., has a body with a triangular cross-section (or other cross-sections) for guiding the AUV into the water. For the launching module 208, there is no need to have a homing device or rotating rollers. However, if there are rotating rollers for facilitating the sliding of the AUV into water, the rotating rollers do not have to be actuated by a motor or other means.

The vessel may be equipped with an acoustic underwater positioning and navigation (AUPN) system as illustrated in FIG. 23. The AUPN system exhibits high accuracy and long range performance in both positioning and telemetry modes. These features are obtained due to the automatic beam forming transducers which focuses the sensitivity towards its targets or transponders. This beam can not only be pointed in any direction below the vessel, but also horizontally and even upwards to the surface as the transducer has the shape of a sphere.

Thus, AUPN is a hydro-acoustic Super Short Base Line (SSBL) or USBL, tow tracking system, able to operate in shallow and deepwater areas to proven ranges in excess of 3000 meters. It is a multi-purpose system used for a wide range of applications including towfish and towed platform tracking, high accuracy subsea positioning and telemetry and scientific research.

The AUPN is used to determine the AUV position after landing on the seabed. In one embodiment, the actual AUV's position is measured while traveling with the AUPN and it is then provided to the AUV, while gliding to its desired position, to correct its INS trajectory. In still another exemplary embodiment, the AUPN is used to send a wake-up signal to the AUV to instruct the AUV to return to the surface.

Figure 25:
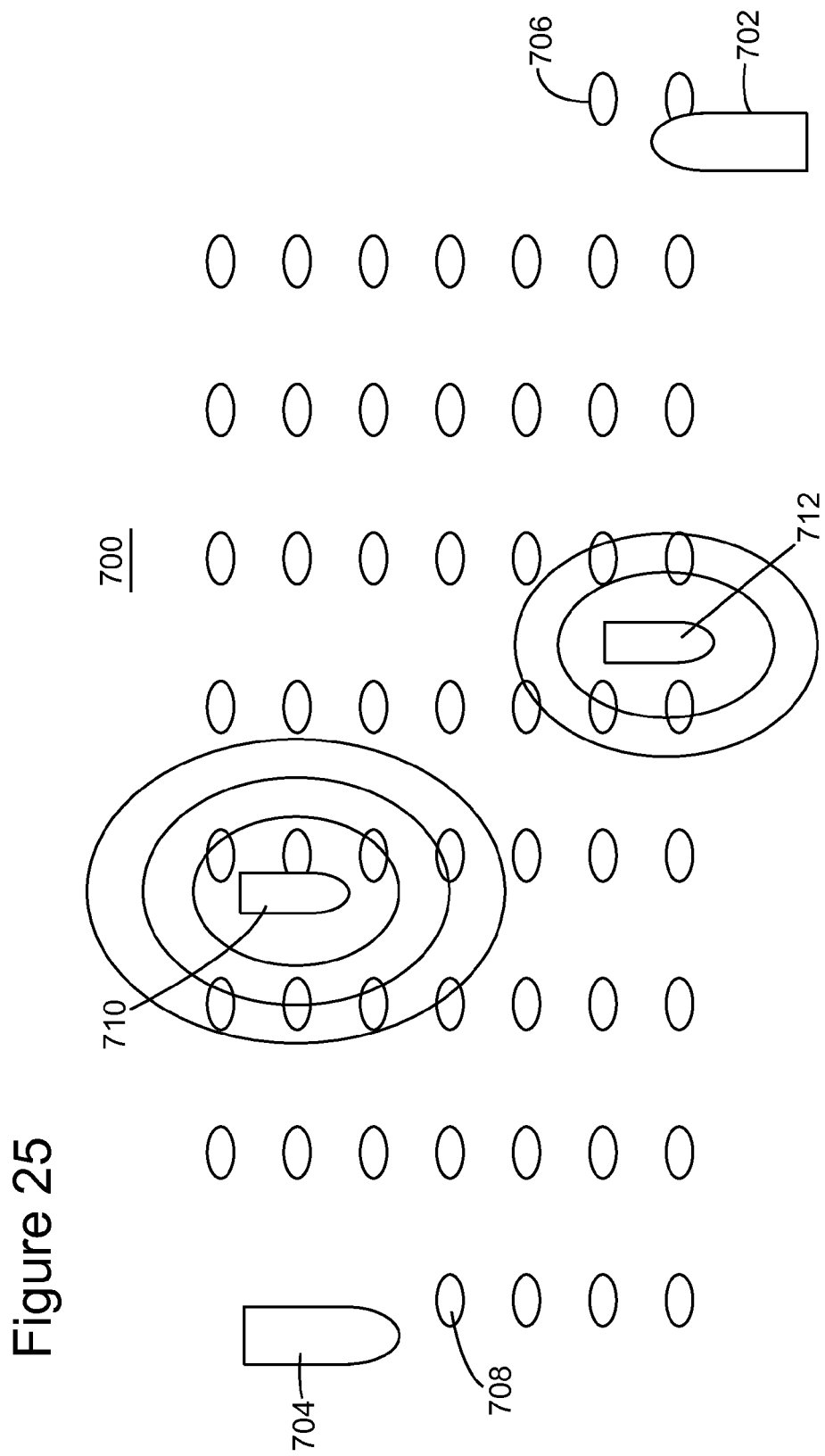
FIG. 25 is a schematic diagram of a seismic survey performed with recovery and deployment vessels according to an exemplary embodiment.

Another embodiment for deploying and recovering AUVs is now discussed with regard to FIG. 25. FIG. 25 shows a seismic system 700 that includes a deployment vessel 702 and a recovery vessel 704. The deployment vessel 702 is tasked to deploy AUVs 706 while the recovery vessel 704 is tasked to recover AUVs 708. Both vessels 702 and 704 may be deployment and recovery vessels as discussed above. In this embodiment, dedicated shooting vessels 710 and 712 follow their own path and generate acoustic waves. In one application, the deployment and recovery vessels do not tow source arrays. Although FIG. 25 shows two shooting vessels, those skilled in the art would appreciate that one or more than two shooting vessels may be used. In another application, the deployment and recovery vessels operate continuously. When the deployment vessel is empty, it switches positions with the recovery vessel. The shooting of the sources may continue while the deployment and recovery vessels switch positions.

The deploying and recovery processes discussed above are just some examples for illustrating the novel concepts of using AUVs for seismic data recording. Those skilled in the art would appreciate that these processes may be changed, adjusted, or modified to fit various needs.

Figure 26:
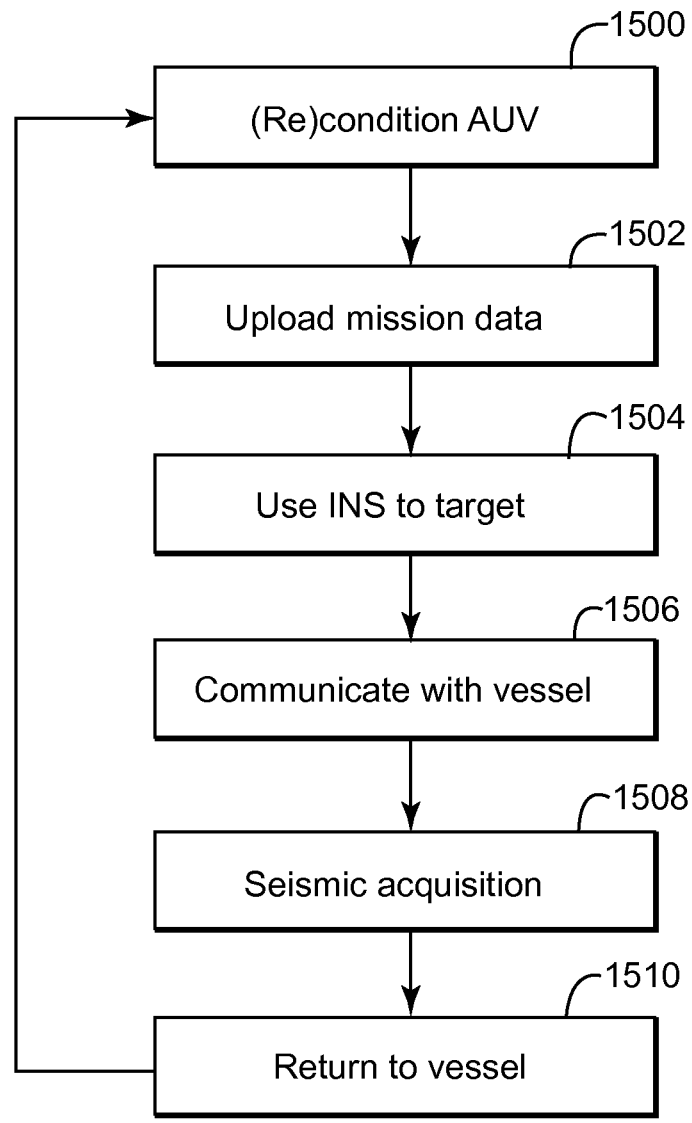
FIG. 26 is a flowchart of a method for recovering and deploying AUVs from a vessel according to an exemplary embodiment.

A method for deploying and recovering the AUVs is now discussed with regard to the flowchart presented in FIG. 26. In step 1500 the AUV is prepared for launching. This preparation phase, i.e., conditioning if the AUV is launched for the first time or reconditioning if the AUV is recycled, may include one or more of charging the batteries, downloading seismic data, checking the system, etc.

In the next step 1502, the mission data for that specific AUV is loaded in its processor. This may be happening while the AUV is on the deck of the vessel or the AUV is already loaded in its launching tube or ramp. The mission data may include the present position of the AUV, the final desired position on the bottom of the ocean (landing position), frequencies of the acoustic signals to be exchanged with AUPN to check the landing position, frequency of the wake-up acoustic signal, attitude of the AUV at launching, etc. After this, the AUV is launched in step 1504. The AUV is configured to use its INS and the uploaded mission data to travel to its final destination. In one application, the AUV does not receive any information from the vessel while travelling. However, in another application, the AUV may receive additional information from the vessel, for example, its current position as measured by the AUPN of the vessel. In still another application, beacons may be used to guide the AUV. In still another application, some of the already deployed AUVs may function as beacons.

In step 1506, after the AUV have settled to the seabed, the vessel interrogates the AUV about its position. The AUV replies with a reference beam and the AUPN of the vessel determines the position of the AUV. The position of the AUV may be determined with an accuracy of, for example, +/−2 m when the AUV is at a depth not larger than 300 m. Step 1506 may be performed in parallel (or instead) of step 1504, and of step 1510.

After this step, the AUV is ready to record seismic signals in step 1508. This process may last as long as necessary. In one application, after the shooting vessel have triggered their source arrays in a predetermined vicinity of the AUV, the AUV is instructed in step 1510, for example, using the AUPN of the vessel to wake-up and start resurfacing. During this step the AUV starts its motor and moves towards the recovery vessel. The AUV may navigate in the same direction of the vessel so the difference of speed is small, and the time for the AUV to position itself is increased. In one application, the recovery vessel is the same with the deployment vessel. The AUV may be helped to arrive at the recovery vessel by acoustic signals emitted by the recovery vessel. Once the AUV arrives at the recovery vessel, the AUV engages the recovery unit (e.g., chute) of the recovery vessel and the AUV is handled to arrive on the deck of the vessel for reconditioning as described in step 1500. The AUV may also be delivered under the deck of the recovery vessel for the reconditioning (maintenance) phase or on a back deck handling module fixed on the deck. Then, the whole process may be repeated so that the AUVs are constantly reused undersea for the seismic survey.

Figure 27:
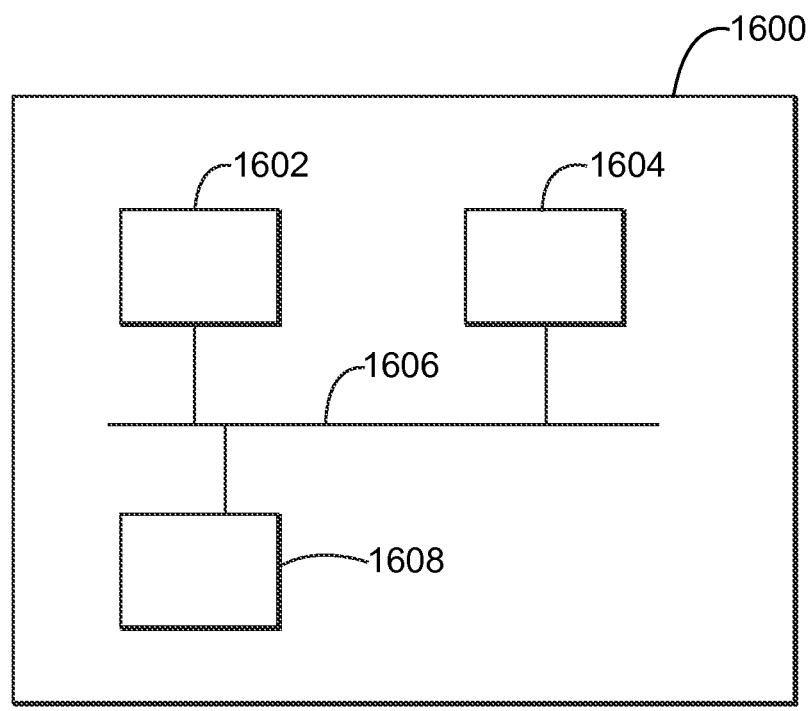
FIG. 27 is a schematic diagram of a controller for implementing a method of deploying and recovering AUVs according to an exemplary embodiment.

The above-discussed processes may be implemented by a central controller located on the vessel. A possible configuration of such a controller is schematically illustrated in FIG. 27. Such a controller 1600 includes a processor 1602 and a storage device 1604 that communicate together via a bus 1606. An input/output interface 1608 also communicates with the bus 1606 and allows an operator to communicate with the processor or the memory, for example, to input software instructions for operating the AUPN of the vessel, or the INS of the AUV, etc. The input/output interface 1608 may also be used by the controller to communicate with other controllers or interfaces that are provided on the vessel. For example, the input/output interface 1608 may communicate with a GPS system (not shown) for acquiring the actual position of the AUV at launch time or with an acoustical system. The controller 1600 may be a computer, a server, a processor or dedicated circuitry.

One or more of the exemplary embodiments discussed above disclose a method for deploying and recovering AUVs configured to perform seismic recordings. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A vessel for performing a marine acoustic survey of a subsurface, the vessel comprising:
    a launching module configured to launch an autonomous underwater vehicle (AUV) in water;
    a recovery module configured to recover the AUV from the water;
    a homing device mounted on the recovery module and configured to guide the AUV to the recovery module while in the water;
    a management module connecting the launching module to the recovery module and configured to transport the AUV while on the vessel; and
    an acoustic system configured to determine a location of the AUV after landing on the ocean bottom and configured to activate the AUV when a time to return to the surface arises.

2. The vessel of claim 1, wherein the management module is mounted on a deck of the vessel.

3. The vessel of claim 1, wherein the management module comprises:
    a transportation system configured to transport the AUV in a vertical position while on the vessel.

4. The vessel of claim 1, wherein an end of the launching module and an end of the recovery module are underwater.

5. The vessel of claim 1, wherein the recovery module includes a body having a triangular-like cross-section that matches a cross-section of the AUV.

6. The vessel of claim 1, wherein the recovery module includes guidance rollers configured to rotate in a desired direction for transporting the AUV from the water toward an upper part of the vessel.

7. The vessel of claim 1, wherein the launching module includes a body having a triangular cross-section that matches a cross-section of the AUV.

8. The vessel of claim 1, wherein the management module provides a single track for the AUV between the launching module and the recovery module.

9. The vessel of claim 1, wherein the management module provides parallel tracks for the AUV between the launching module and the recovery module.

10. A vessel for performing a marine acoustic survey of a subsurface, the vessel comprising:
a launching module configured to launch an autonomous underwater vehicle (AUV) underwater;
a recovery module configured to recover the AUV; and
a management module connecting the launching module to the recovery module and configured to transport the AUV while on a deck of the vessel,
wherein the management module includes,
a first management zone configured to receive the AUV from the recovery module and to sort the AUV into damaged and undamaged AUVs;
a conveyor zone configured to receive the undamaged AUV;
a maintenance module configured to receive the damaged AUVs; and
a second management zone connected to the conveyor zone and configured to receive the undamaged AUV,
wherein the second management zone is also connected to the launching module.

11. The vessel of claim 10, wherein the management module comprises:
a transfer module configured to transfer the AUV from the recovery module to the management module.

12. The vessel of claim 10, wherein the conveyor zone comprises:
a conveyor mechanism configured to move the AUV along the deck of the vessel.

13. The vessel of claim 10, wherein an end of the launching module and an end of the recovery module are underwater.

14. A method for performing a marine acoustic survey of a subsurface, the method comprising:
deploying through a launching module an autonomous underwater vehicle (AUV) underwater;
guiding the AUV to a recovery module with a homing device mounted on the recovery module after the AUV has recorded seismic data of the subsurface;
recovering with the recovery module the AUV; and
transporting the recovered AUV with a management module back to the launching module for redeployment;
inspecting the AUV after passing the recovery module; and
sorting the AUV into damaged and undamaged AUVs and passing the AUV to a corresponding path.

15. The method of claim 14, further comprising:
removing the seismic data from the AUV while passing the management module; and
recharging or replacing a battery of the AUV while passing the management module.

16. The method of claim 14, further comprising:
maintaining the damaged AUV in a maintenance module that is separated from the management module.

17. A vessel for performing a marine acoustic survey of a subsurface, the vessel comprising:
a launching module configured to launch an autonomous underwater vehicle (AUV) in water;
a recovery module configured to recover the AUV from the water;
a homing device mounted on the recovery module and configured to guide the AUV to the recovery module while in the water; and
a management module connecting the launching module to the recovery module and configured to transport the AUV while on the vessel,
wherein the recovery module includes a body having a triangular cross-section that matches a cross-section of the AUV.

18. A vessel for performing a marine acoustic survey of a subsurface, the vessel comprising:
a launching module configured to launch an autonomous underwater vehicle (AUV) in water;
a recovery module configured to recover the AUV from the water;
a homing device mounted on the recovery module and configured to guide the AUV to the recovery module while in the water; and
a management module connecting the launching module to the recovery module and configured to transport the AUV while on the vessel,
wherein the launching module includes a body having a triangular cross-section that matches a cross-section of the AUV.

* * * * *